(12) United States Patent
Rittinge et al.

(10) Patent No.: US 12,246,516 B2
(45) Date of Patent: Mar. 11, 2025

(54) BUILDING PANEL AND A METHOD TO PRODUCE SUCH A BUILDING PANEL

(71) Applicant: Välinge Innovation AB, Viken (SE)

(72) Inventors: Rickard Rittinge, Förslöv (SE); Sofia Nilsson, Jonstorp (SE); Magnus Nilsson, Båstad (SE); Fredrik Nilsson, Höganäs (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 17/768,022

(22) PCT Filed: Oct. 16, 2020

(86) PCT No.: PCT/SE2020/050990
§ 371 (c)(1),
(2) Date: Apr. 11, 2022

(87) PCT Pub. No.: WO2021/076040
PCT Pub. Date: Apr. 22, 2021

(65) Prior Publication Data
US 2023/0373197 A1    Nov. 23, 2023

(30) Foreign Application Priority Data

Oct. 18, 2019 (SE) .................................. 1930331-2
Dec. 6, 2019 (SE) .................................. 1951411-6

(51) Int. Cl.
*B32B 21/13* (2006.01)
*B27D 1/06* (2006.01)
(Continued)

(52) U.S. Cl.
CPC .............. *B32B 21/13* (2013.01); *B27D 1/06* (2013.01); *B32B 3/085* (2013.01); *B32B 7/12* (2013.01);
(Continued)

(58) Field of Classification Search
CPC .. B32B 3/085; B32B 3/14; B32B 7/12; B32B 21/02; B32B 21/13; B32B 21/14;
(Continued)

(56) References Cited

U.S. PATENT DOCUMENTS

| 6,132,549 A | 10/2000 | Nieckarz et al. |
| 2003/0033784 A1* | 2/2003 | Pervan .................. E04F 15/02 52/592.1 |

(Continued)

FOREIGN PATENT DOCUMENTS

| CN | 1325791 A | 12/2001 |
| CN | 2478752 Y | 2/2002 |

(Continued)

OTHER PUBLICATIONS

Translation of JP2016210022A (bib, description and claims). (Year: 2016).*

(Continued)

*Primary Examiner* — Catherine A. Simone
(74) *Attorney, Agent, or Firm* — Boone IP Law

(57) ABSTRACT

A building panel including a balancing layer having a top surface and a bottom surface, a first sub-layer is arranged on the top surface of the balancing layer, wherein the first sub-layer includes a binder, a surface layer arranged above a surface of the first sub-layer facing away from the balancing layer, the surface layer having a top surface and a bottom surface and including a first wood veneer (10) having a grain direction, wherein an extension of the surface layer in a direction parallel to the grain direction of the first wood veneer is equal or less than an extension of the balancing layer in the direction parallel to the grain direction of the first wood veneer, and wherein the surface layer is (Continued)

arranged within the extension of the balancing layer in the direction parallel to the grain direction of the first wood veneer.

20 Claims, 7 Drawing Sheets

(51) Int. Cl.
| | |
|---|---|
| *B32B 3/08* | (2006.01) |
| *B32B 7/12* | (2006.01) |
| *B32B 21/02* | (2006.01) |
| *B32B 21/14* | (2006.01) |
| *B32B 37/24* | (2006.01) |
| *E04F 13/08* | (2006.01) |
| *E04F 13/10* | (2006.01) |
| *E04F 15/04* | (2006.01) |
| *E04F 15/10* | (2006.01) |

(52) U.S. Cl.
CPC .............. *B32B 21/02* (2013.01); *B32B 21/14* (2013.01); *B32B 37/24* (2013.01); *E04F 13/0866* (2013.01); *E04F 13/10* (2013.01); *E04F 15/041* (2013.01); *E04F 15/107* (2013.01); *B32B 2250/44* (2013.01); *B32B 2255/08* (2013.01); *B32B 2255/26* (2013.01); *B32B 2307/7376* (2023.05); *B32B 2317/16* (2013.01); *B32B 2607/00* (2013.01)

(58) Field of Classification Search
CPC ..... B32B 21/042; B32B 21/047; B32B 37/24; B32B 2307/7376; B32B 2250/44; B32B 2255/08; B32B 2255/26; B32B 2317/16; B32B 2607/00; E04F 13/10; E04F 13/0866; E04F 13/0873; E04F 15/041; E04F 15/107; E04F 15/04; B27D 1/06; B27D 5/006; Y10T 428/163; Y10T 428/183; Y10T 428/24066; Y10T 428/24091; B44F 9/02
USPC ............................................. 428/77, 78, 192
See application file for complete search history.

(56) References Cited

U.S. PATENT DOCUMENTS

| | | |
|---|---|---|
| 2005/0196607 A1 | 9/2005 | Shih et al. |
| 2011/0162794 A1 | 7/2011 | Zeik et al. |
| 2015/0275526 A1 | 10/2015 | Persson et al. |
| 2017/0305119 A1 | 10/2017 | Bergelin et al. |
| 2019/0210329 A1 | 7/2019 | Ziegler et al. |
| 2019/0210330 A1 | 7/2019 | Ziegler et al. |

FOREIGN PATENT DOCUMENTS

| | | |
|---|---|---|
| CN | 103459145 A | 12/2013 |
| CN | 203843949 U | 9/2014 |
| CN | 204414267 U | 6/2015 |
| CN | 104963481 A | 10/2015 |
| CN | 105058540 A | 11/2015 |
| CN | 106567524 A | 4/2017 |
| CN | 206937520 U | 1/2018 |
| CN | 207140020 U | 3/2018 |
| EP | 2353861 A1 | 8/2011 |
| EP | 2671696 A1 | 12/2013 |
| JP | 2012-111129 A | 6/2012 |
| JP | 2016210022 A | * 12/2016 |

OTHER PUBLICATIONS

International Preliminary Report on Patentability received for PCT Patent Application No. PCT/SE20/050990, mailed on Apr. 28, 2022, 9 pages.
International Search Report and Written Opinion received for PCT Patent Application No. PCT/SE2020/050990, mailed on Nov. 18, 2020, 13 pages.
Office Action received for Chinese Patent Application No. 202080071867.X, mailed on Aug. 1, 2022, 11 pages (5 pages of English Translation and 6 pages of Original Document).
Supplementary European Search Report and Search Opinion received for European Application No. 20877341.6, mailed on Sep. 13, 2023, 7 pages.
U.S. Appl. No. 18/914,474, Göran Ziegler, filed Oct. 14, 2014.
U.S. Appl. No. 18/755,648, Magnus Nilsson, filed Jun. 26, 2024.
U.S. Appl. No. 18/741,549, Daniel Scialanga, filed Jun. 12, 2024.
U.S. Appl. No. 17/769,594, Rickard Rittinge, filed Apr. 15, 2022.
U.S. Appl. No. 17/038,567, Marcus Bergelin, filed Sep. 30, 2020.
U.S. Appl. No. 17/090,511, Guido Schulte, filed Nov. 5, 2020.
U.S. Appl. No. 17/543,962, Magnus Nilsson, filed Dec. 7, 2021.
U.S. Appl. No. 17/697,417, Göran Ziegler, filed Mar. 17, 2022.
U.S. Appl. No. 17/711,487, Darko Pervan, filed Apr. 1, 2022.
U.S. Appl. No. 17/747,325, Göran Ziegler, filed May 18, 2022.
U.S. Appl. No. 18/047,755, Guido Schulte, filed Oct. 19, 2022.
U.S. Appl. No. 18/157,811, Anette Hedlund, filed Jan. 20, 2023.
U.S. Appl. No. 16/365,764, Christer Lundblad, filed Mar. 27, 2019.
U.S. Appl. No. 18/289,506, Göran Ziegler, filed Nov. 3, 2023.
U.S. Appl. No. 18/392,427, Göran Ziegler, filed Dec. 21, 2023.
U.S. Appl. No. 18/576,241, Rickard Rittinge, filed Jan. 3, 2024.
U.S. Appl. No. 18/576,294, Rickard Rittinge, filed Jan. 3, 2024.

* cited by examiner

BUILDING PANEL AND A METHOD TO PRODUCE SUCH A BUILDING PANEL

TECHNICAL FIELD

The disclosure generally relates but is not limited to the field of building panels with a surface layer comprising wood veneer, preferably floor panels, wall panels and furniture components.

TECHNICAL BACKGROUND

Embodiments of the invention are particularly suitable for use in floating floors, which are formed of floor panels with a surface layer comprising a wood veneer. The following description of known technique, problems of known systems and objects and features of the disclosure will therefore, as a non-restrictive example, be aimed above all at this field of application and in particular at floorings which are similar to traditional wood fibre based laminate floorings.

It should be emphasized that the embodiments of the invention can also be used in other applications as, for example, wall panels, ceilings, furniture components, and similar.

Known Technique and Problems Thereof

Several technologies are used to provide a floor panel comprising a wood veneer, which are similar to the solid floor panel. These panels may be produced more cost efficient and a floor with a separate layer attached to a substrate of for example HDF, plywood or wood veneer is more moisture stable than solid wood floors.

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprises two paper sheets, a 0.1 mm thick printed decorative paper and a transparent 0.05-0.1 mm thick overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common surface materials are wood veneer and foils, which are glued to a substrate. The surface may also be a powder layer comprising wood fibres, melamine resins, colour pigments and, optionally, aluminium oxide particles.

Wood veneers may provide the most natural look of a building panel.

It is known that a wood veneer may be pressed on a powder layer as described above and that such a powder layer may provide increased impact resistance. This will not solve the cost problems.

U.S. Pat. No. 2,831,793 discloses a composite wood veneer panel. A thin veneer is applied to a composite fibrous core of lignocellulose particles and binder and openings of the veneer are filled with core material when pressed together to form the composite panel. In the manufacture of the plywood or veneered panels according to this document, the plugging of the surface layer opening defects is done simultaneously with the formation of the board.

SUMMARY

It is an object of at least embodiments of the present invention to provide an improvement over the above described techniques and known art.

It is a further object of at least embodiments of the invention to provide a building panel with the improved surface properties.

The objective of at least certain embodiments of the present invention is to provide a building panel, such as a floor panel, with a wood-based surface layer, which has a more attractive surface design and/or better surface properties and/or cost structure than present known floorings.

It is a further object of at least embodiments the invention to minimise the costs of production of the building panel, by for example avoiding cutting any discoloured parts or edges.

At least some of these and other objects and advantages that will be apparent from the description.

According to one aspect, a building panel is provided, comprising:
  a balancing layer having a top surface and a bottom surface,
  a first sub-layer is arranged on the top surface of the balancing layer, the first sub-layer comprising a binder,
  a surface layer arranged above a surface of the first sub-layer facing away from the balancing layer, the surface layer having a top surface and a bottom surface and comprising a first wood veneer having a grain direction, wherein the top surface of the surface layer is adapted to be a visible surface of the building panel when installed,
  wherein an extension of the surface layer in a direction parallel to the grain direction of the first wood veneer is equal or less than an extension of the balancing layer in the direction parallel to the grain direction of the first wood veneer, and
  wherein the surface layer is arranged within the extension of the balancing layer in the direction parallel to the grain direction of the first wood veneer.

The surface layer being arranged within the extension of the balancing layer in the direction parallel to the grain direction of the first wood veneer may be defined as being arranged within the boundaries of the balancing layer in said direction, and/or as the surface layer ends within the extension of the balancing layer in said direction.

The balancing layer may extend to, or extend beyond, the surface layer in a direction parallel to the grain direction of the first wood veneer.

An edge of the first veneer extending in the direction transverse to the grain direction of the first veneer may be a short edge of the first veneer. The short edge of the first veneer may be position within the boundaries of the balancing layer, including being aligned with an edge of the balancing layer.

In an embodiment, the building panel comprises the balancing layer, the first sub-layer arranged above the balancing layer, and the surface layer arranged above the first sub-layer.

The surface layer may comprise several veneer parts together forming the first veneer, such as being stitched or glued together, or may comprise several first veneers.

In the following, the direction parallel to the grain direction and a direction transverse to the grain direction are parallel to a plane formed by the top surface of the surface layer.

An advantage of the first aspect is that bleeding of the binder from the sub-layer to the first wood veneer of the surface layer is at least reduced by positioning the surface layer within the extension the balancing layer. By an edge of the surface layer being aligned with an edge of the balancing layer, or arranged with a distance from the extension of the balancing layer, this so-called "waterfall" tendency is at least reduced. Discolouration of the first wood veneer by the binder is reduced. Thereby, the amount of waste resulting from portions of the wood veneer that is required to be removed due to this discolouration is reduced. Since the wood veneer forms the visible surface of the final product, such defects have to be removed.

Furthermore, the "waterfall" tendency also leads to inferior connection between the wood veneer and the sub-layer and/or core. During transportation, the wood veneer tends to disconnect from the core/sub-layer due to the waterfall effect. Thereby, improved connection between the wood veneer and the core is obtained.

This waterfall tendency is increased and more apparent on an edge of the wood veneer extending in the direction transverse to the grain direction. The binder tends to travel around the edge and then continue in the grain direction. An edge of a wood veneer extending in a direction transverse to the grain direction often forms a short edge of the wood veneer. In the final product, for example in an installed floor, the human eye is more sensible to discoloration of the short edges, as such short edges interrupt the visual impression of the flooring.

In the final building panel, any protruding part of the balancing layer and/or the first sub-layer may be cut, for example as a consequence of forming a locking system. Compared to the situation where the waterfall tendency has occurred, the portion to be removed is smaller than if the binder has discoloured the top surface of the surface layer.

An extension of the surface layer in a direction transverse to the grain direction of the first wood veneer is equal or less than an extension of the balancing layer in the direction transverse to the grain direction of the first wood veneer, and wherein the surface layer is arranged within the extension of the balancing layer in the direction transverse to the grain direction of the first wood veneer. Thereby, the waterfall tendency is reduced also along an edge of the first wood veneer extending parallel to the grain direction, such as a long side edge.

The balancing layer may comprise a second wood veneer.

In an embodiment, the building panel may further comprise a core having a top surface and a bottom surface, a second sub-layer arranged on the top surface of the core, wherein the second sub-layer is positioned between the top surface of the core and the bottom surface of the surface layer, and the bottom surface of the core is in contact with the first sub-layer. In this embodiment, the building panel comprises the balancing layer, the first sub-layer arranged on the first sub-layer, the core arranged on the first sub-layer, the second sub-layer arranged on the core, and the surface layer arranged on the second sub-layer.

The extension of the surface layer and/or the balancing layer in the direction parallel to the grain direction of the first wood veneer may be equal or less than an extension of the core in the direction parallel to the grain direction of the first wood veneer. The surface layer and/or the balancing layer may be arranged within the extension of the core in the direction parallel to the grain direction of the first wood veneer.

The extension of the surface layer and/or the balancing layer in the direction transverse to the grain direction of the first wood veneer may be equal or less than an extension of the core in the direction transverse to the grain direction of the first wood veneer. The surface layer and/or the balancing layer may be arranged within the extension of the core in the direction transverse to the grain direction of the first wood veneer.

In an embodiment, wherein the balancing layer comprises a second wood veneer, an extension of the balancing layer in a direction parallel to a grain direction of the second wood veneer is equal or less than an extension of the core in the direction parallel to the grain direction of the second wood veneer. The balancing layer may be arranged within the extension of the core in the direction parallel to the grain direction of the second wood veneer.

In an embodiment, wherein the balancing layer comprises a second wood veneer, an extension of the balancing layer in a direction transverse to a grain direction of the second wood veneer is equal or less than an extension of the core in the direction transverse to the grain direction of the second wood veneer. The balancing layer may be arranged within the extension of the core in the direction transverse to the grain direction of the second wood veneer.

The binder of the first and/or the second sub-layer may be applied in powder form.

The core may have a thickness of between 2 and 12 mm.

The surface layer may have a thickness of between 0.2 and 2.5 mm.

The balancing layer may have a thickness of between 0.2 mm and 2.5 mm.

The first sub-layer and/or the second sub-layer may comprise inorganic fillers.

The first sub-layer and/or the second sub-layer may comprise fibres, preferably wood fibres.

The core may be a wood-based core, such as HDF board, MDF board, plywood or a lamella core.

The core may be a fibre based core, preferably HDF or MDF board.

The binder in the first and/or second sub-layer may be a thermoplastic or a thermosetting binder.

The binder in the first sub-layer may be the same or different from the binder of the second sub-layer.

The binder in the first and/or second sub-layer may be an amino resin, preferably melamine formaldehyde resin or urea formaldehyde resin.

The first and/or second sub-layer may comprise a foaming agent.

The first and/or the second wood veneer layer may be selected from oak, maple, birch, walnut, ash, pine.

The thickness of the building panel may be between 1-20 mm, preferably between 4-12 mm.

The building panel may be selected from a floor panel, a wall panel or a furniture panel. The building panel may be an individual panel, or may be further divided into planks.

According to a second aspect, a method to produce a building panel is provided. The method comprises:
  providing a balancing layer having a top surface and a bottom surface,
  arranging a first sub-layer comprising a binder on the top surface of the balancing layer,
  arranging a surface layer above a surface the first sub-layer facing away from the balancing layer, the surface layer having a top surface and a bottom surface and comprising a first wood veneer having a grain direction, wherein the top surface of the surface layer is adapted to be a visible surface of the building panel when installed, wherein an extension of the surface layer in a direction parallel to the grain direction of the first wood veneer is equal or less than an extension of the balancing layer in the direction parallel to the grain direction of the first wood veneer, positioning the surface layer relative the balancing layer such that the surface layer is arranged within the extension of the balancing layer in the direction parallel to the grain direction of the first wood veneer, and applying heat and pressure to the surface layer, the first sub-layer and the balancing layer to obtain a building panel.

By the surface layer being arranged within the extension of the balancing layer in the direction parallel to the grain direction of the first wood veneer may be defined as being arranged within the boundaries of the balancing layer in said direction, or as the surface layer ends within the extension of the balancing layer in said direction.

The balancing layer may extend to, or extend beyond, the surface layer in a direction parallel to the grain direction of the first wood veneer.

An edge of the first veneer extending in the direction transverse to the grain direction of the first veneer may be a short edge of the first veneer. The short edge of the first veneer may be position within the boundaries of the balancing layer, including being aligned with an edge of the balancing layer.

The surface layer may comprise several veneer parts together forming the first veneer, such as being stitched or glued together, or may comprise several first veneers.

In the following, the direction parallel to the grain direction and a direction transverse to the grain direction are parallel to a plane formed by the top surface of the surface layer.

The second aspect incorporates all the advantages previously discussed when referring to the first aspect, whereby the previous discussion is applicable also for the method to produce the wood-based board.

An edge of the first veneer extending in the direction transverse to the grain direction of the first veneer may be a short edge of the first veneer.

The surface layer may comprise several veneer parts together forming the first veneer, such as being stitched or glued together, or may comprise several first veneers.

In an embodiment, the method comprises providing the balancing layer, applying the first sub-layer on the balancing layer, and arranging the surface layer on the first sub-layer.

In an embodiment, the method may further comprise arranging a core having a top surface and a bottom surface on the first sub-layer, and arranging a second sub-layer comprising a binder on the top surface of the core, wherein the second sub-layer is positioned between the top surface of the core and the bottom surface of the surface layer, and the bottom surface of the core is in contact with the first sub-layer. In this embodiment, the method comprises providing the balancing layer, applying the first sub-layer, arranging a core on the first sub-layer, applying a second sub-layer on the core, and arranging the surface layer on the second sub-layer.

An extension of the surface layer in a direction transverse to the grain direction of the first wood veneer may be equal or less than an extension of the balancing layer in the direction transverse to the grain direction of the first wood veneer, and wherein the surface layer is arranged within the extension of the balancing layer in the direction transverse to the grain direction of the first wood veneer.

The balancing layer may comprise a second wood veneer.

The extension of the surface layer and/or the balancing layer in the direction parallel to the grain direction of the first wood veneer may be equal or less than an extension of the core in the direction parallel to the grain direction of the first wood veneer. The surface layer and/or the balancing layer may be arranged within the extension of the core in the direction parallel to the grain direction of the first wood veneer.

The extension of the surface layer and/or the balancing layer in the direction transverse to the grain direction of the first wood veneer may be equal or less than an extension of the core in the direction transverse to the grain direction of the first wood veneer. The surface layer and/or the balancing layer may be arranged within the extension of the core in the direction transverse to the grain direction of the first wood veneer.

In an embodiment, wherein the balancing layer comprises a second wood veneer, an extension of the balancing layer in a direction parallel to a grain direction of the second wood veneer is equal or less than an extension of the core in the direction parallel to the grain direction of the second wood veneer. The balancing layer may be arranged within the extension of the core in the direction parallel to the grain direction of the second wood veneer.

In an embodiment, wherein the balancing layer comprises a second wood veneer, an extension of the balancing layer in a direction transverse to a grain direction of the second wood veneer is equal or less than an extension of the core in the direction transverse to the grain direction of the second wood veneer. The balancing layer may be arranged within the extension of the core in the direction transverse to the grain direction of the second wood veneer.

A binder of the first and/or the second sub-layer may be applied in powder form.

The first and/or the second sub-layer may be applied by the scattering.

The binder of the first and/or second sub-layer may be a thermoplastic or thermosetting binder.

The binder of the first and/or second sub-layer may be an amino resin, preferably melamine formaldehyde resin or urea formaldehyde resin.

The binder in the first sub-layer may be the same or different from the binder of the second sub-layer.

The first and/or second sub-layer may comprise a foaming agent.

The core may have a thickness after pressing of between 2 and 12 mm.

The surface layer may have a thickness after pressing of between 0.2 and 2.5 mm.

The balancing layer may have a thickness after pressing of between 0.2 mm and 2.5 mm.

The first sub-layer and/or the second sub-layer may comprise inorganic fillers.

The first sub-layer and/or the second sub-layer may comprise fibres, preferably wood fibres.

The core may be a wood-based core, such as HDF board, MDF board, plywood or a lamella core. The core may be a fibre based core, preferably HDF or MDF board.

The first and/or second sub-layer may comprise a foaming agent.

The first and/or the second wood veneer layer may be selected from oak, maple, birch, walnut, ash, pine.

The thickness of the building panel after pressing may be between 1-20 mm, preferably between 4-12 mm.

The building panel may be selected from a floor panel, a wall panel or a furniture panel. The building panel may be an individual panel, or may be further divided into planks.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, to which a reference is made in the text.

DETAILED DESCRIPTION

Figure 1:
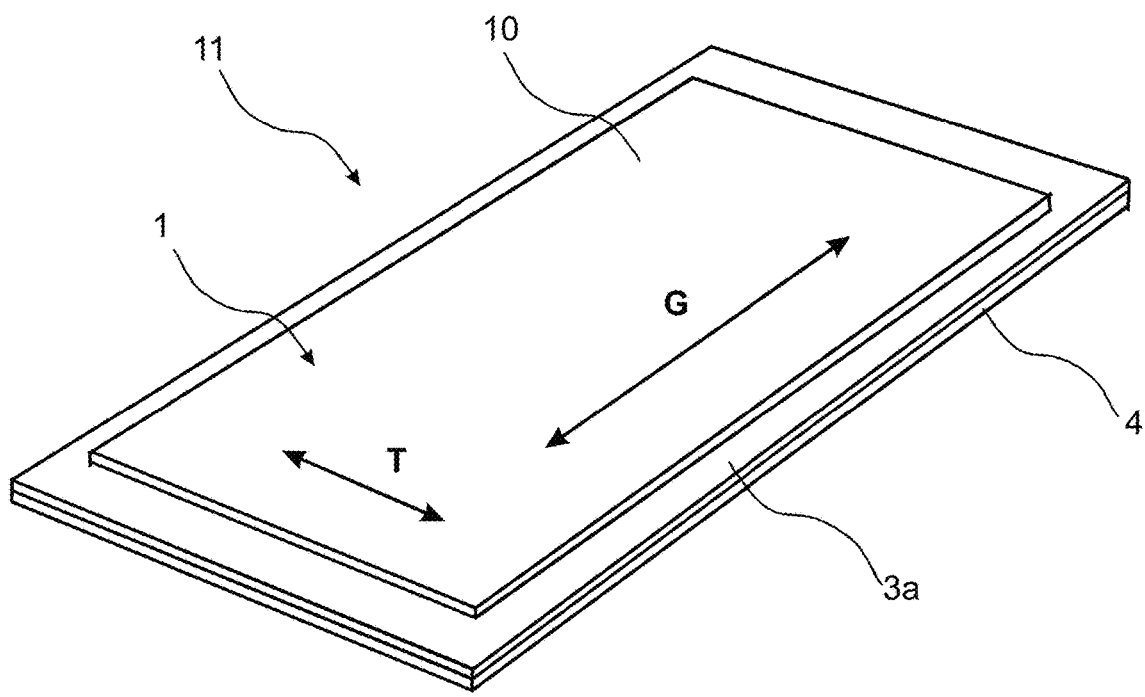
FIG. 1 discloses a perspective view of an embodiment of a building panel.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims.

The different aspects, alternatives and embodiments of the invention disclosed herein can be combined with one or more of the other aspects, alternatives and embodiments described herein. Two or more aspects can be combined.

The objective of at least certain embodiments of the present invention is to provide a building panel, such as a floor panel, with a wood veneer based surface layer, which has a more attractive surface design and/or better surface properties and/or lower costs than present known floorings.

At least some of these and other objects and advantages that will be apparent from the description.

Figure 5A:
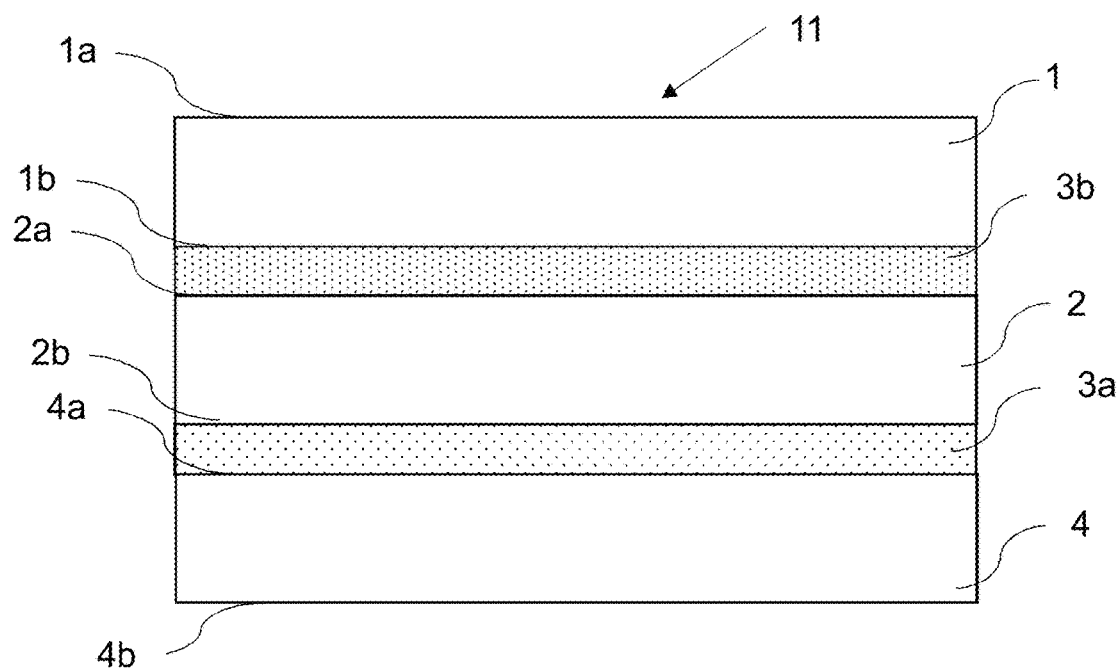
FIG. 5A discloses a cross-section of the embodiment disclosed in FIGS. 2-4.
Figure 5B:
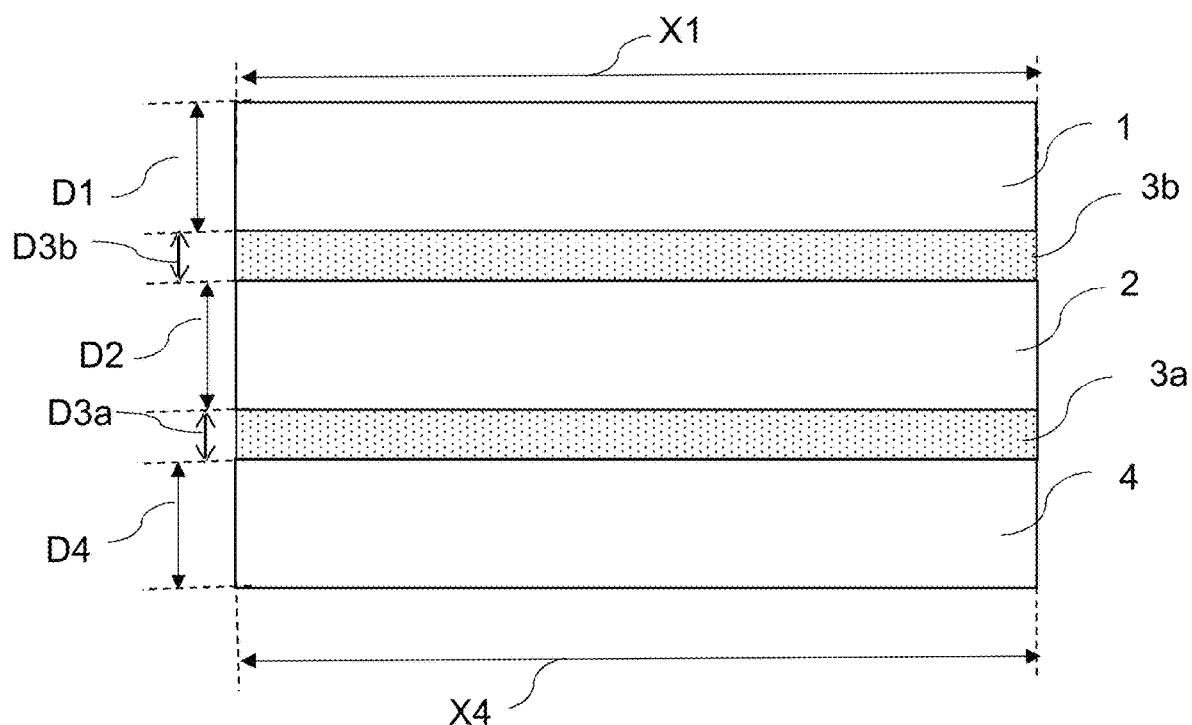
FIG. 5B discloses a cross-section of the embodiment disclosed in FIGS. 2-4.

FIG. 1 discloses a building panel 11 comprising a surface layer 1, a first sub-layer 3a, and a balancing layer 4. A cross-section of the building panel 11 is shown in FIG. 5D. A top surface 1a of the surface layer 1 is intended to form a visible surface of the building panel 11 when later installed. The first sub-layer 3a is arranged on a top surface 4a of the balancing layer 4. The surface layer 1 is arranged on a top surface of the sub-layer 3a. A lower surface 4b of the balancing layer 4 is intended to face the surface on which the building panel is to be installed.

The building panel in the embodiment shown in FIG. 1 may also be referred to as a veneered element.

The surface layer 1 may comprise a first wood veneer 10, or may be formed of a first wood veneer 10. The first wood veneer 10 has a grain direction G. The balancing layer 4 may comprise a second wood veneer, or may be formed of a second wood veneer.

A direction parallel to the grain direction G and a direction transverse to the grain direction are parallel to a plane formed by the top surface 1a of the surface layer 1.

The first and or the second wood veneer may be oak, maple, birch, walnut, ash, pine.

The first and/or the second veneer may be a rotary veneer, or a cut veneer. In one embodiment, the first veneer may be a cut veneer, and the second veneer may be a rotary veneer.

The first and the second veneer may be formed of more than one veneer element. The veneer elements may be stitched or glued together to form the first and/or the second veneer. If the first veneer is formed of more than one wood veneer, the wood veneers may be positioned such that the grain directions G of the wood veneer are aligned.

The sub-layer 3a comprises a binder. The binder may be a thermoplastic or thermosetting binder. The thermosetting binder may be an amino resin such as melamine formaldehyde resin or urea formaldehyde resin. The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The first and/or the second sub-layer 3a, 3b may further comprise fillers. The filler may be organic or inorganic. The fillers are preferably in a powder form. The inorganic fillers may be selected from barium sulphate and calcium carbonate. The organic filler may be wood fibres such as cellulosic and/or lignocellulosic fibres.

The building panel shown in FIG. 1 may be formed by applying the first sub-layer 3 on the top surface 4a of the balancing layer 4. The first sub-layer 3a may be applied as a powder, as a liquid, or as a paste. The first sub-layer may be stabilised by applying moisture, and optionally drying thereafter.

The first sub-layer 3a may be applied in an amount of 200-600 g/m2, preferably 300-500 g/m2 such as about 400 g/m2, such as about 430-470 g/sm2, such as 500-550 g/m2. The first sub-layer 3 may comprise the binder in an amount of 20-80 wt %, preferably in an amount of 40-60 wt % such as about 50 wt %.

After the first sub-layer 3a has been applied on the balancing layer 4, the surface layer 1 is applied on the first sub-layer 3a. A lower surface 1b of the surface layer 1 is facing the sub-layer 3a. The surface layer 1 is positioned on the first sub-layer 3, relative the balancing layer 4, such that the surface layer 1 ends within the extension of the balancing layer 4, at least in a direction parallel to the grain direction G of the first wood veneer 10.

The surface layer 1 has an extension in a direction parallel to the grain direction G of the first wood veneer 10 which is equal or less than the extension of the balancing layer 4 in the direction parallel to the grain direction G of the first wood veneer 10. Further, the surface layer 1 does not protrude outside the balancing layer in the direction parallel to the grain direction G of the first wood veneer 10. Consequently, the surface layer 1 ends within the extension of the balancing layer 4 the direction parallel to the grain direction G of the first wood veneer 10. The surface layer 1 ends within the boundaries of the balancing layer 4 the direction parallel to the grain direction G of the first wood veneer 10.

In an embodiment, an edge of the surface layer 1 extending in a direction transverse T to the grain direction G of the first wood veneer 10 is aligned with an edge of the balancing layer 4 extending in the direction transverse T to the grain direction G of the first wood veneer 10. Such an edge of the surface layer 1 may be a short edge of the surface layer 1.

In another embodiment, like in the embodiment shown in FIG. 1, the balancing layer 4 protrudes beyond the surface layer in the direction parallel to the grain direction G of the first wood veneer 10 with a distance. The distance may be 0-10 mm, such as 0-5 mm. The distance may be 1 mm or more, preferably 2 mm or more.

In the embodiment shown in FIG. 1, the surface layer 1 is positioned on the first sub-layer 3a, relative the balancing layer 4, such that the surface layer 1 has an extension in a direction parallel to the grain direction G of the first wood veneer 10 which is less than the extension of the balancing layer 4 in the direction parallel to the grain direction G of the first wood veneer 10. The balancing layer 4 extends beyond the surface layer 1 in the direction parallel to the grain direction G of the first wood veneer 10.

In the embodiment shown in FIG. 1, an extension of the surface layer 1 in a direction transverse T the grain direction G of the first wood veneer 10 is equal or less than an extension of the balancing layer 4 in the direction transverse T the grain direction G of the first wood veneer 10. Further, the surface layer 1 does not protrude outside the balancing layer 4 in the direction transverse T to the grain direction G of the first wood veneer 10. Consequently, the surface layer 1 ends within the extension of the balancing layer 4 in the direction transverse T to the grain direction G of the first wood veneer 10.

In an embodiment, an edge of the surface layer 1 extending in a direction parallel to the grain direction G of the first wood veneer 10 is aligned with an edge of the balancing layer 4 extending in the direction parallel to the grain direction G of the first wood veneer 10. Such an edge of the surface layer 1 may be a long edge of the surface layer 1.

In another embodiment, like in the embodiment shown in FIG. 1, the balancing layer 4 protrudes beyond the surface layer 1 in the direction transverse T to the grain direction G of the first wood veneer 10 with a distance. The distance may be 0-10 mm, such as 0-5 mm. The distance may be 1 mm or more, preferably 2 mm or more.

In the embodiment shown in FIG. 1, the surface layer 1 is positioned on the first sub-layer 3a, relative the balancing layer 4, such that the surface layer 1 has an extension in a direction transverse T to the grain direction G of the first wood veneer 10 which is less than the extension of the balancing layer 4 in the direction transverse T to the grain direction G of the first wood veneer 10. The balancing layer 4 extends beyond the surface layer 1 in the direction transverse T to the grain direction G of the first wood veneer 10.

In the embodiment shown in FIG. 1, the surface layer 1 is positioned such that the grain direction G of the first wood veneer 10 is parallel to a longitudinal direction of the surface layer 1. The longitudinal direction of the balancing layer 4 is extending in direction parallel to the grain direction G of the first wood veneer 10.

In the embodiment shown in FIG. 1, the edge of the surface layer 1 extending in a direction transverse T to the grain direction G of the first wood veneer 10 is a short edge of the surface layer 1. The edge of the surface layer 1 extending in a direction parallel to the grain direction G of the first wood veneer 10 is a long edge of the surface layer 1 in the embodiment shown in FIG. 1.

In the embodiment shown in FIG. 1, the edge of the balancing layer 4 extending in a direction transverse T to the grain direction G of the first wood veneer 10 is a short edge of the balancing layer 4. The edge of the balancing layer 4 extending in a direction parallel to the grain direction G of the first wood veneer 10 is a long edge of the balancing layer 4 in the embodiment shown in FIG. 1.

When the surface layer 1 is positioned on the first sub-layer 3a, heat and pressure is applied to form the building panel 11. Pressure applied may be at least 15 bar. The pressure may be applied during at least 15 s, preferably during at least 30 s, more preferably during at least 45 s. The temperature may be at least 150° C., such as 150-200° C. Heat and pressure may be applied in a short cycle press, or in continuous press.

The building panel 11 thereby formed may form an individual plank. The building panel 11 may be provided with a mechanical locking system at its long and/or short edges.

Alternatively, the building panel 11 may be divided into planks. Each plank may be provided with a mechanical locking system at its long and/or short edges.

Figure 2:
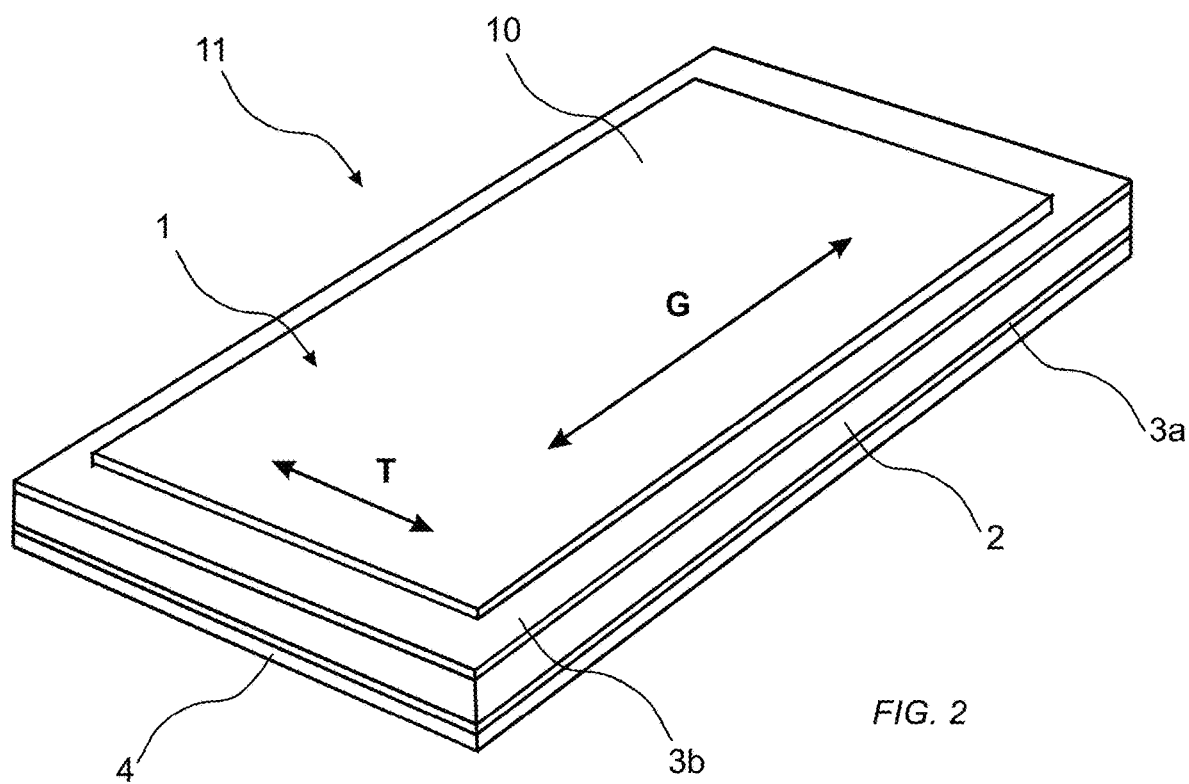
FIG. 2 discloses a perspective view an embodiment of a building panel.

An embodiment of a building panel 11 will now be described with reference to FIG. 2. FIG. 2 discloses a building panel comprising a surface layer 1, a second sub-layer 3b, a core 2, a first sub-layer 3a, and a balancing layer 4. A cross-section of the building panel 11 is shown in FIGS. 5A-B. A top surface 1a of the surface layer 1 is intended to form a visible surface of the building panel 11 when later installed. The first sub-layer 3a is arranged intermediate the balancing layer 4 and the core 2. The second sub-layer 3b is arranged intermediate the surface layer 1 and the core 2.

A lower surface 4b of the balancing layer 4 is intended to face the surface on which the building panel is to be installed. The first sub-layer 3a is arranged on a top surface 4a of the balancing layer 4. A lower surface 2b of the core 2 is arranged on the first sub-layer 3a. The second sub-layer 3b is arranged on a top surface 2a of the core 2. A lower surface 1b of the surface layer 1 is arranged on the second sub-layer 3b.

The surface layer 1 may comprise a first wood veneer 10, or may be formed of a first wood veneer 10. The first wood veneer 10 has a grain direction G. The balancing layer surface layer 4 may comprise a second wood veneer, or may be formed of a second wood veneer.

A direction parallel to the grain direction G and a direction transverse T to the grain direction are parallel to a plane formed by the top surface 1a of the surface layer 1.

The first and or the second wood veneer may be oak, maple, birch, walnut, ash, pine.

The first and/or the second veneer may be a rotary veneer, or a cut veneer. In one embodiment, the first veneer may be a cut veneer, and the second veneer may be a rotary veneer.

The first and the second veneer may be formed of more than one veneer element. The veneer elements may be stitched or glued together to form the first and/or the second veneer. If the first veneer is formed of more than one wood veneer, the wood veneers may be positioned such that the grain directions G of the wood veneers are aligned.

The first and/or the second sub-layer 3a, 3b comprises a binder. The binder may be a thermoplastic or thermosetting binder. The thermosetting binder may be an amino resin such as melamine formaldehyde resin or urea formaldehyde resin. The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The first and/or the second sub-layer 3a, 3b may further comprise fillers. The filler may be organic or inorganic. The fillers are preferably in a powder form. The inorganic fillers may be selected from barium sulphate and calcium carbonate. The organic filler may be wood fibres such as cellulosic and/or lignocellulosic fibres.

The core 2 may be a wood-based board, for example, a wood-fibre based board such as MDF or HDF, or plywood, lamella core, or wood veneer. The core may be a Wood Plastic Composite (WPC). In an embodiment, the core may be a mineral composite board, a fibre cement board, a magnesium oxide cement board, a ceramic board, or a plastic board such as a thermoplastic board.

The building panel shown in FIG. 2 may be formed by applying the first sub-layer 3a on the top surface 4a of the balancing layer 4. The first sub-layer 3a may be stabilised by applying moisture, and optionally drying thereafter.

Alternatively, the first sub-layer 3a may be formed by applying the first sub-layer 3a on a lower surface 2b of the core 2. The first sub-layer 3a may be stabilised by applying moisture, and thereafter dried, for example by applying IR. After the sub-layer has been stabilised, the core 2 is turned and arranged on the balancing layer 4, or the balancing layer 4 is arranged on the first sub-layer 3a and the assembly is thereafter turned.

The first sub-layer 3a may be applied as a powder, as a liquid, or as a paste, on the core 2 or the balancing layer 4.

The first sub-layer 3a may be applied in an amount of 200-600 g/m2, preferably 300-500 g/m2 such as about 400 g/m2, such as about 430-470 g/sm2, such as 500-550 g/m2. The first sub-layer 3a may comprise the binder in an amount of 20-80 wt %, preferably in an amount of 40-60 wt % such as about 50 wt %.

The core 2 is arranged on the first sub-layer 3a. The second sub-layer 3b is applied on the top surface 2a of the core 2 facing away from the first sub-layer 3a. The second sub-layer 3b may be applied as a powder, as a liquid, or as a paste, on the core 2.

The second sub-layer 3b may be applied in an amount of 200-600 g/m2, preferably 300-500 g/m2 such as about 400 g/m2, such as about 430-470 g/m2, such as 500-550 g/m2. The second sub-layer 3b may comprise the binder in an amount of 20-80 wt %, preferably in an amount of 40-60 wt % such as about 50 wt %.

After the second sub-layer 3b has been applied on the core 2, the surface layer 1 is applied on the second sub-layer 3b.

The surface layer 1 is positioned on the second sub-layer 3b, relative the balancing layer 4, such that the surface layer 1 ends within the extension of the balancing layer 4, at least in a direction parallel to the grain direction G of the first wood veneer 10.

The surface layer 1 has an extension in a direction parallel to the grain direction G of the first wood veneer 10 which is equal or less than the extension of the balancing layer 4 in the direction parallel to the grain direction G of the first wood veneer 10. Further, the surface layer 1 does not protrude outside the balancing layer in the direction parallel to the grain direction G of the first wood veneer 10. Consequently, the surface layer 1 ends within the extension of the balancing layer 4 the direction parallel to the grain direction G of the first wood veneer 10. The surface layer 1 ends within the extension boundaries of the balancing layer 4 in the direction parallel to the grain direction G of the first wood veneer 10.

In an embodiment, an edge of the surface layer 1 extending in a direction transverse T to the grain direction G of the first wood veneer 10 is aligned with an edge of the balancing layer 4 extending in the direction transverse T to the grain direction G of the first wood veneer 10. Such an edge of the surface layer 1 may be a short edge of the surface layer 1.

In another embodiment, like in the embodiment shown in FIG. 2, the balancing layer protrudes beyond the surface layer in the direction parallel to the grain direction G of the first wood veneer 10 with a distance. The distance may be 0-10 mm, such as 0-5 mm. The distance may be 1 mm or more, preferably 2 mm or more.

In the embodiment shown in FIG. 2, the surface layer 1 is positioned relative the balancing layer 4 such that the surface layer 1 has an extension in a direction parallel to the grain direction G of the first wood veneer 10 which is less than the extension of the balancing layer 4 in the direction parallel to the grain direction G of the first wood veneer 10. The balancing layer 4 extends beyond the surface layer 1 in the direction parallel to the grain direction G of the first wood veneer 10.

In the embodiment shown in FIG. 2, an extension of the surface layer 1 in a direction transverse T the grain direction G of the first wood veneer 10 is equal or less than an extension of the balancing layer 4 in the direction transverse T the grain direction G of the first wood veneer 10. Further, the surface layer 1 does not protrude outside the balancing layer 4 in the direction transverse T to the grain direction G of the first wood veneer 10. Consequently, the surface layer 1 ends within the extension of the balancing layer 4 the direction transverse T to the grain direction G of the first wood veneer 10.

In an embodiment, an edge of the surface layer 1 extending in a direction parallel to the grain direction G of the first wood veneer 10 is aligned with an edge of the balancing layer 4 extending in the direction parallel to the grain direction G of the first wood veneer 10. Such an edge may be a long edge of the surface layer 1.

In another embodiment, like in the embodiment shown in FIG. 2, the balancing layer 4 protrudes beyond the surface layer in the direction transverse T to the grain direction G of the first wood veneer 10 with a distance. The distance may be 0-10 mm, such as 0-5 mm. The distance may be 1 mm or more, preferably 2 mm or more.

In the embodiment shown in FIG. 2, the surface layer 1 is positioned relative the balancing layer 4 such that the surface layer 1 has an extension in a direction transverse T to the grain direction G of the first wood veneer 10 which is less than the extension of the balancing layer 4 in the direction transverse T to the grain direction G of the first wood veneer 10. The balancing layer 4 extends beyond the surface layer 1 in the direction transverse T to the grain direction G of the first wood veneer 10.

In the embodiment shown in FIG. 2, the surface layer 1 is positioned such that the grain direction G of the first wood veneer 10 is parallel to a longitudinal direction of the balancing layer 4. The longitudinal direction of the balancing layer 4 is extending in direction parallel to the grain direction G of the first wood veneer 10.

In the embodiment shown in FIG. 2, the edge of the surface layer 1 extending in a direction transverse T to the grain direction G of the first wood veneer 10 is a short edge of the surface layer 1. The edge of the surface layer 1 extending in a direction parallel to the grain direction G of the first wood veneer 10 is a long edge of the surface layer 1 in the embodiment shown in FIG. 2.

In the embodiment shown in FIG. 2, the edge of the balancing layer 4 extending in a direction transverse T to the grain direction G of the first wood veneer 10 is a short edge of the balancing layer 4. The edge of the balancing layer 4 extending in a direction parallel to the grain direction G of the first wood veneer 10 is a long edge of the balancing layer 4 in the embodiment shown in FIG. 2.

When the surface layer 1 is positioned on the second sub-layer 3b, heat and pressure is applied on the assembly formed by the balancing layer 4, the first sub-layer 3a, the core 2, the second sub-layer 3b, and the surface layer 1 in order to form the building panel 11. Pressure applied may be at least 15 bar. The pressure may be applied during at least 15 s, preferably during at least 30 s, more preferably during at least 45 s. The temperature may be at least 150° C., such as 150-200° C. Heat and pressure may be applied in a short cycle press, or in continuous press.

The building panel 11 thereby formed may form an individual plank. The building panel 11 may be provided with a mechanical locking system at its long and/or short edges.

Alternatively, the building panel 11 may be divided into planks. Each plank may be provided with a mechanical locking system at its long and/or short edges.

Figure 3:
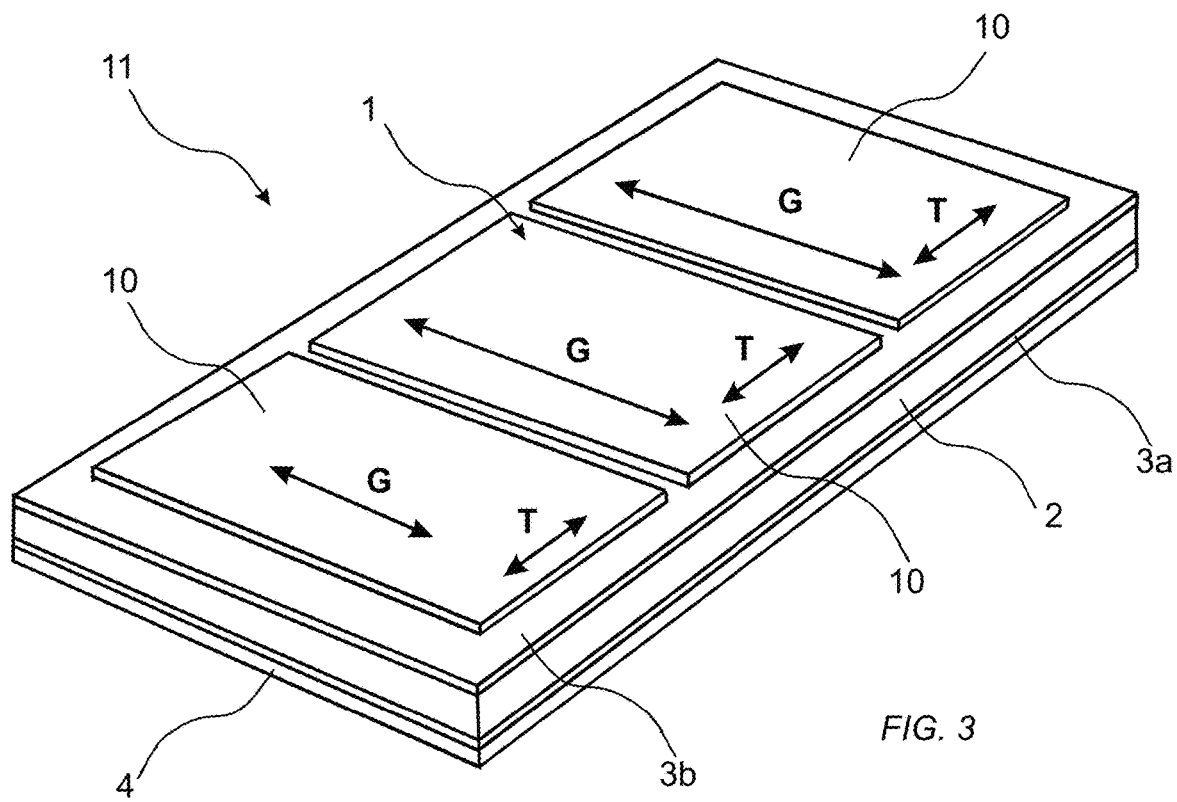
FIG. 3 discloses a perspective view an embodiment of a building panel.

An embodiment will now be described with reference to FIG. 3. FIG. 3 discloses a building panel comprising a surface layer 1, a second sub-layer 3b, a core 2, a first sub-layer 3a, and a balancing layer 4. A cross-section of the building panel 11 is shown in FIGS. 5A-B. A top surface 1a of the surface layer 1 is intended to form a visible surface of the building panel 11 when later installed. The first sub-layer 3a is arranged intermediate the balancing layer 4 and the core 2. The second sub-layer 3b is arranged intermediate the surface layer 1 and the core 2.

A lower surface 4b of the balancing layer 4 is intended to face the surface on which the building panel is to be installed. The first sub-layer 3a is arranged on a top surface 4a of the balancing layer 4. A lower surface 2b of the core 2 is arranged on the first sub-layer 3a. The second sub-layer 3b is arranged on a top surface 2a of the core 2. A lower surface 1b of the surface layer 1 is arranged on the second sub-layer 3b.

In the embodiment shown in FIG. 3, surface layer 1 comprises several first wood veneers 10. The first wood veneers 10 each has a grain direction G. In the embodiment shown in FIG. 3, the first wood veneers 10 are arranged such that their grain directions G are parallel.

A direction parallel to the grain direction G and a direction transverse T to the grain direction are parallel to a plane formed by the top surface 1a of the surface layer 1.

The balancing layer 4 may comprise a second wood veneer, or may be formed of a second wood veneer.

The first and or the second wood veneer may be oak, maple, birch, walnut, ash, pine.

The first and/or the second veneer may be a rotary veneer, or a cut veneer. In the embodiment shown in FIG. 3, the first wood veneers may be a cut veneer, and the second wood veneer may be a rotary veneer.

The second veneer may be formed of more than one veneer element. The veneer elements may be stitched or glued together to form the first and/or the second veneer.

The first and/or the second sub-layer 3a comprises a binder. The binder may be a thermoplastic or thermosetting binder. The thermosetting binder may be an amino resin such as melamine formaldehyde resin or formaldehyde resin. The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The first and/or the second sub-layer 3a, 3b may further comprise fillers. The filler may be organic or inorganic. The fillers are preferably in a powder form. The inorganic fillers may be selected from barium sulphate and calcium carbonate. The organic filler may be wood fibres such as cellulosic and/or lignocellulosic fibres.

The core 2 may be a wood-based board, for example, a wood-fibre based board such as MDF or HDF, or plywood, lamella core, or wood veneer. The core may be a Wood Plastic Composite (WPC). In an embodiment, the core may be a mineral composite board, a fibre cement board, a magnesium oxide cement board, a ceramic board, or a plastic board such as a thermoplastic board.

The building panel shown in FIG. 3 may be formed by applying the first sub-layer 3a on the balancing layer 4. The first sub-layer 3a may be stabilised by applying moisture, and optionally drying thereafter.

Alternatively, the first sub-layer 3a may be formed by applying the first sub-layer 3a on the core 2. The first sub-layer 3a may be stabilised by applying moisture, and thereafter dried, for example by applying IR. After the first sub-layer 3a has been stabilised, the core 2 is turned and arranged on the balancing layer 4, or the balancing layer 4 is applied on the first sub-layer 3a and thereafter turned.

The first sub-layer 3a may be applied as a powder, as a liquid, or as a paste, on the core 2 or the balancing layer 4

The first sub-layer 3a may be applied in an amount of 200-600 g/m2, preferably 300-500 g/m2 such as about 400 g/m2, such as about 430-470 g/sm2, such as 500-550 g/m2. The first sub-layer 3a may comprise the binder in an amount of 20-80 wt %, preferably in an amount of 40-60 wt % such as about 50 wt %.

The core 2 is arranged on the first sub-layer 3a. The second sub-layer 3b is applied on a top surface 2a of the core 2 facing away from the first sub-layer 3a. The second sub-layer 3b may be applied as a powder, as a liquid, or as a paste, on the core 2.

The second sub-layer 3b may be applied in an amount of 200-600 g/m2, preferably 300-500 g/m2 such as about 400 g/m2, such as about 430-470 g/m2, such as 500-550 g/m2. The second sub-layer 3b may comprise the binder in an amount of 20-80 wt %, preferably in an amount of 40-60 wt % such as about 50 wt %.

After the second sub-layer 3b has been applied on the core 2, the surface layer 1 is applied on the second sub-layer 3b. In the embodiment shown in FIG. 3, several first wood veneers 10 are arranged on the second sub-layer 3b. The first wood veneers 10 of the surface layer 1 is positioned on the second sub-layer 3b, relative the balancing layer 4, such that each first wood veneer 10, and thereby the surface layer 1, ends within the extension of the balancing layer 4, at least in a direction parallel to the grain direction G of the first wood veneers 10.

The first wood veneers 10, and thereby the surface layer 1, has an extension in a direction parallel to the grain direction G of the first wood veneers 10 which is equal or less than the extension of the balancing layer 4 in the direction parallel to the grain direction G of the first wood veneers 10. Further, each first wood veneer 10, and thereby the surface layer 1, does not protrude outside the balancing layer 4 in the direction parallel to the grain direction G of the first wood veneers 10. Consequently, each of the first wood veneer 10, and thereby the surface layer 1, ends within the extension of the balancing layer 4 in the direction parallel to the grain direction G of the first wood veneers 10.

In an embodiment, an edge of each first wood veneer 10 extending in a direction transverse T to the grain direction G of the first wood veneers 10 is aligned with an edge of the balancing layer 4 extending in the direction transverse T to the grain direction G of the first wood veneers 10. Such an edge of the first wood veneers 10 may be a short edge of the first wood veneers 10.

In another embodiment, like in the embodiment shown in FIG. 3, the balancing layer 4 protrudes beyond each first wood veneer 10, and thereby the surface layer 1 in the direction parallel to the grain direction G of the first wood veneer 10 with a distance. The distance may be 0-10 mm, such as 0-5 mm. The distance may be 1 mm or more, preferably 2 mm or more.

In the embodiment shown in FIG. 3, each first wood veneer 10, and thereby the surface layer 1, is positioned on the second sub-layer 3b, relative the balancing layer 4, such that each first wood veneer 10, and thereby the surface layer 1, has an extension in a direction parallel to the grain direction G of the first wood veneers 10 which is less than the extension of the balancing layer 4 in the direction parallel to the grain direction G of the first wood veneers 10. The balancing layer 4 extends beyond each first wood veneer 10, and thereby the surface layer 1, in the direction parallel to the grain direction G of the first wood veneers 10.

In the embodiment shown in FIG. 3, an extension of each first wood veneer 10, and thereby the surface layer 1, in a direction transverse T the grain direction G of the first wood veneers 10 is equal or less than an extension of the balancing layer 4 in the direction transverse T the grain direction G of the first wood veneers 10. Further, each first wood veneers 10, and thereby the surface layer 1, does not protrude outside the balancing layer 4 in the direction transverse T to the grain direction G of the first wood veneers 10. Consequently, each first wood veneer 10, and thereby the surface layer 1, ends within the extension of the balancing layer 4 in the direction transverse T to the grain direction G of the first wood veneers 10.

In an embodiment, an edge of each first wood veneer 10 extending in a direction parallel to the grain direction G of the first wood veneer is aligned with an edge of the balancing layer 4 extending in the direction parallel to the grain direction G of the first wood veneers 10. Such an edge may be a long edge of the first wood veneers.

In another embodiment, like in the embodiment shown in FIG. 3, the balancing layer protrudes beyond the first veneer in the direction transverse T to the grain direction G of the first wood veneer with a distance. The distance may be 0-10 mm, such as 0-5 mm. The distance may be 1 mm or more, preferably 2 mm or more.

In the embodiment shown in FIG. 3, each first wood veneer, and thereby the surface layer 1, is positioned relative the balancing layer 4 such that each first wood veneer 10, and thereby the surface layer 1, has an extension in a direction transverse T to the grain direction G of the first wood veneers 10 which is less than the extension of the balancing layer 4 in the direction transverse T to the grain direction G of the first wood veneers 10. The balancing layer 4 extends beyond each first wood veneer 10, and thereby the surface layer 1, in the direction transverse T to the grain direction G of the first wood veneers 10.

In the embodiment shown in FIG. 3, each first wood veneer is positioned such that the grain direction G of the first wood veneers 10 is transverse T to a longitudinal direction of the balancing layer. The longitudinal direction of the balancing layer 4 is extending in direction transverse T to the grain direction G of the first wood veneers 10.

In the embodiment shown in FIG. 3, the edge of each first wood veneer, in a direction transverse T to the grain direction G of the first wood veneer is a short edge of each first wood veneer. The edge of each first wood veneer extending in a direction parallel to the grain direction G of the first wood veneer is a long edge of each first wood veneer 1 in the embodiment shown in FIG. 3.

In the embodiment shown in FIG. 3, the edge of the balancing layer 4 extending in a direction parallel to the grain direction G of the first wood veneer is a short edge of the balancing layer 4. The edge of the balancing layer 4 extending in a direction transverse T to the grain direction G of the first wood veneers is a long edge of the balancing layer 4 in the embodiment shown in FIG. 3.

When the surface layer 1 is positioned on the second sub-layer 3b, heat and pressure is applied on the assembly formed by the balancing layer 4, the first sub-layer 3a, the core 2, the second sub-layer 3b, and the surface layer 1 in order to form the building panel 11. Pressure applied may be at least 15 bar. The pressure may be applied during at least 15 s, preferably during at least 30 s, more preferably during at least 45 s. The temperature may be at least 150° C., such as 150-200° C. Heat and pressure may be applied in a short cycle press, or in continuous press.

The building panel 11 thereby formed may form an individual plank. The building panel 11 may be provided with a mechanical locking system at its long and/or short edges.

Alternatively, the building panel 11 may be divided into planks. For example, the building panel 11 may be divided between two wood veneers 10. Each plank may be provided with a mechanical locking system at its long and/or short edges.

It is to be noted that the first wood veneers 10 may not be arranged with their grain directions G parallel. In such an embodiment, each first wood veneer 10 is positioned such that the extension of each wood veneer 10 in a direction parallel to each grain direction G is equal or less than the extension of the balancing layer in that direction. All aspects described in relation to a first veneer 10 above are applicable to each first veneer 10 if several first veneers 10 are provided.

It is to be noted that the arrangement of the surface layer 1 comprising several first wood veneers 10 described above with reference to FIG. 3 may also be used with the embodiment only comprising the first sub-layer 3a, disclosed above with reference to FIG. 1. In such an embodiment, several first wood veneers 10 arranged on the first sub-layer 3a, as described above with reference to FIG. 1.

In all embodiments, the balancing layer 4 may be positioned relative the core 2 such that that an extension of the balancing layer in a direction parallel to a grain direction of the second wood veneer of the balancing layer 4 is equal or less than an extension of the core 2 in the direction parallel to the grain direction of the second wood veneer of the balancing layer 4. The extension of the balancing layer 4 in the direction parallel to the grain direction of the second wood veneer of the balancing layer 4 may be within the extension of the core 2 in the direction parallel to the grain direction of the second wood veneer of the balancing layer 4. The balancing layer 4 may not protrude beyond the core 2 in the direction parallel to the grain direction of the second wood veneer of the balancing layer 4. An edge of the balancing layer 4 transverse to the grain direction of the second wood veneer may be aligned with an edge of the core 2 in the direction transverse to the grain direction of the second wood veneer of the balancing layer 4.

The balancing layer 4 may be positioned relative the core 2 such that that an extension of the balancing layer 4 in a direction transverse to a grain direction of the second wood veneer of the balancing layer 4 is equal or less than an extension of the core 2 in the direction transverse to the grain direction of the second wood veneer of the balancing layer 4. The extension of the balancing layer 4 in the direction transverse to the grain direction of the second wood veneer of the balancing layer 4 may be within the extension of the core 2 in the direction transverse to the grain direction of the second wood veneer of the balancing layer 4. The balancing layer 4 may not protrude beyond the core 2 in the direction transverse to the grain direction of the second wood veneer of the balancing layer 4. An edge of the balancing layer 4 parallel to the grain direction of the second wood veneer may be aligned with an edge of the core 2 in the direction parallel to the grain direction of the second wood veneer of the balancing layer 4.

Figure 4:
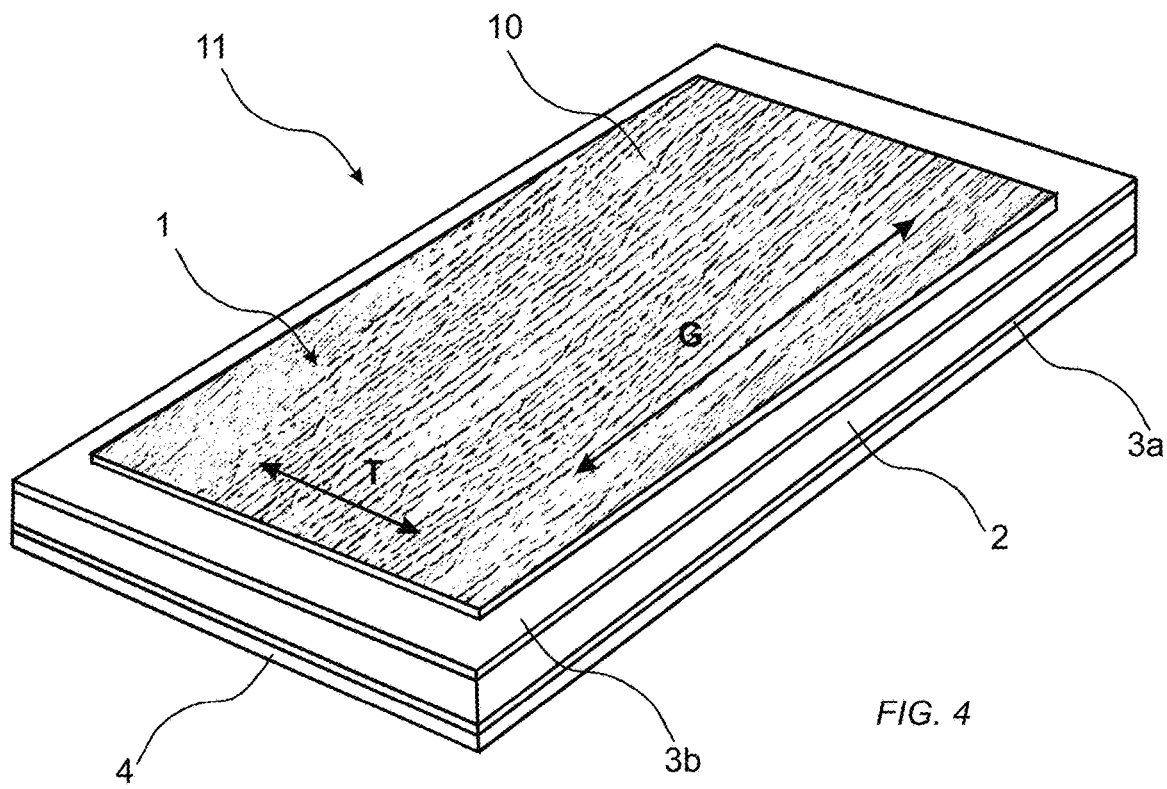
FIG. 4 discloses a perspective view of the embodiment in FIG. 2 wherein the first veneer has been illustrated in more details.

FIG. 4 discloses the same embodiment as in FIG. 2. In FIG. 4, the first wood veneer 10 is visualised by a design of a real wood veneer, illustrating the grain direction G.

Figure 5C:
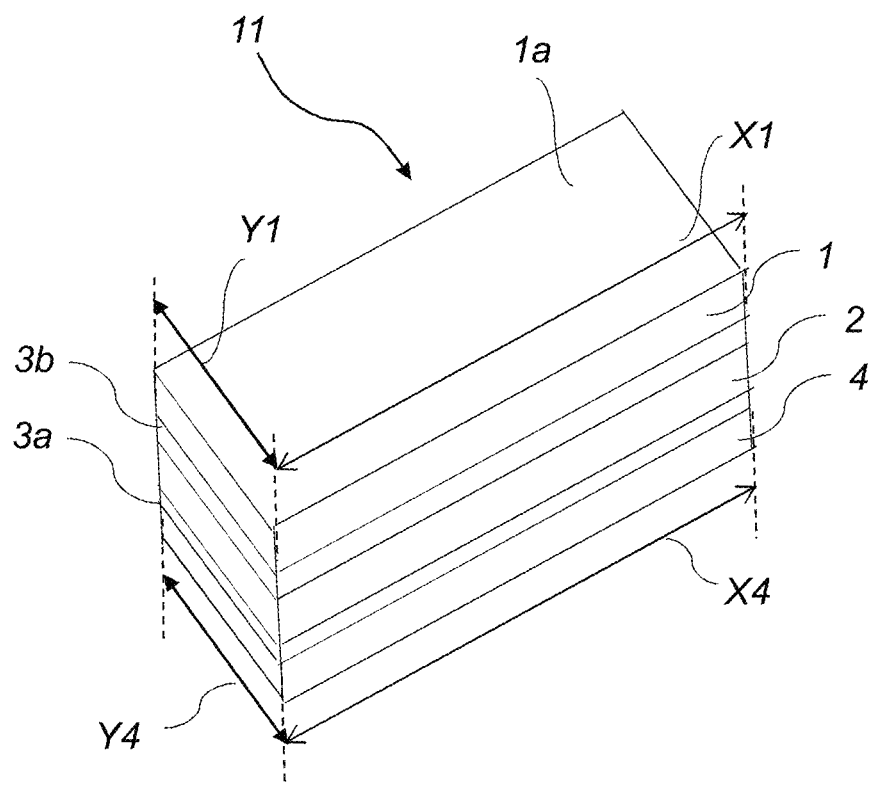
FIG. 5C discloses perspective view of the embodiment disclosed in FIGS. 5A-B.
Figure 5D:
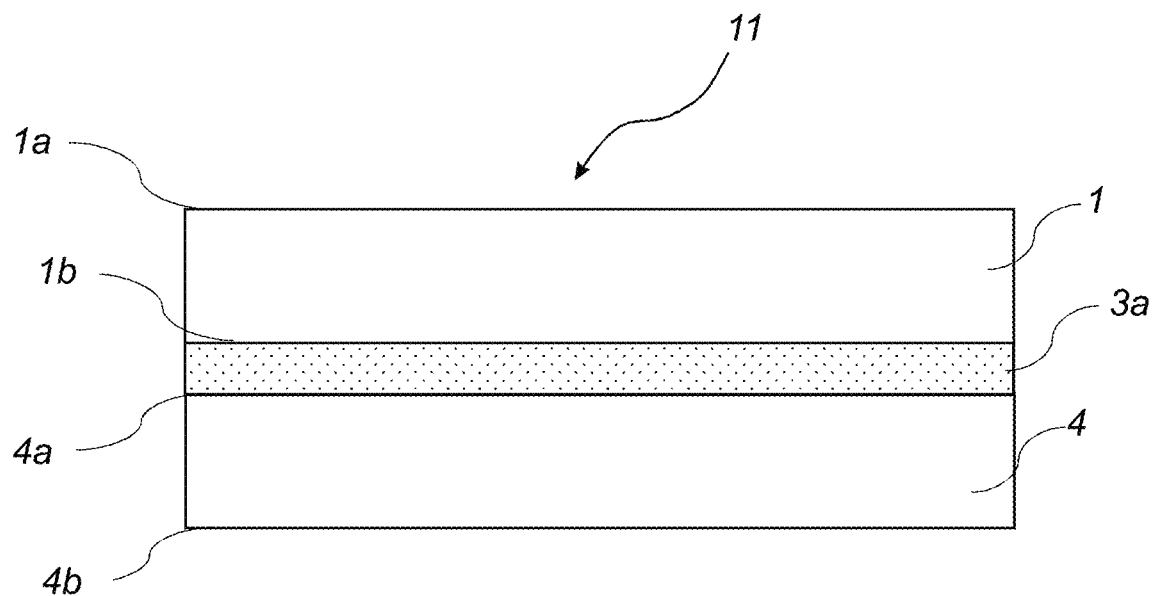
FIG. 5D discloses a cross-section of the embodiment disclosed in FIG. 1.

FIGS. 5A-D illustrates a building panel according to an embodiment of the invention, wherein the building panel comprises a surface layer, a substrate, an optional balancing layer and a first and a second sub-layer. FIG. 5A shows a side view from a side edge of the panel, FIG. 5B shows a side view from a long edge of the panel. FIG. 5C a 3D view of the building panel, wherein the longitudinal (X) and the width (Y) of the surface layer and the balancing layer are defined. FIG. 5D shows a building panel according to an embodiment of the invention, wherein the building panel comprises a surface layer (1), a balancing layer (4) and a first sub-layer (3a).

Figure 6:
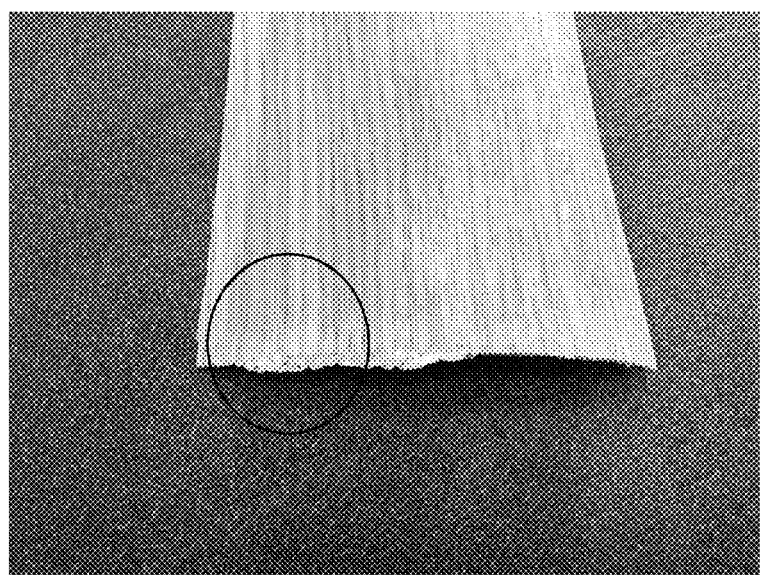
FIG. 6 discloses discoloration along an edge.

FIG. 6 illustrates the building panel wherein the surface layer (1) relative the balancing layer (4) is positioned such that the edge of the surface layer protrudes beyond the edge of the balancing layer. The undesired discoloration in observed in this case.

FIGS. 7A-F illustrates an incorrect positioning of the surface layer (1) relative the balancing layer (4) in the building panel with a core (2).

Figure 7A:
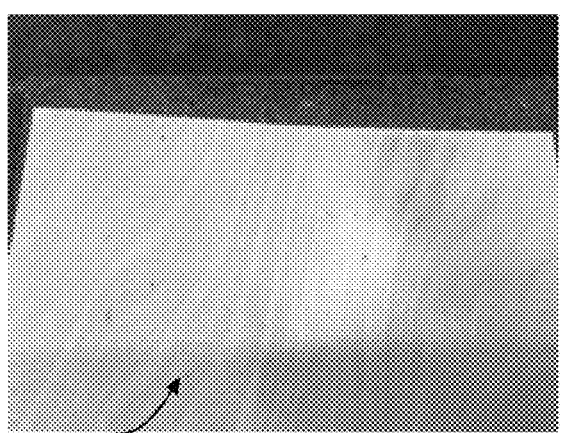
FIGS. 7A-F disclose incorrect positioning of the surface layer relative the balancing layer.
Figure 7B:
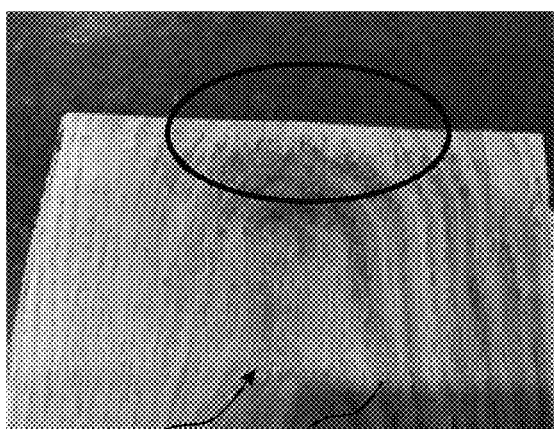
Figure 7C:
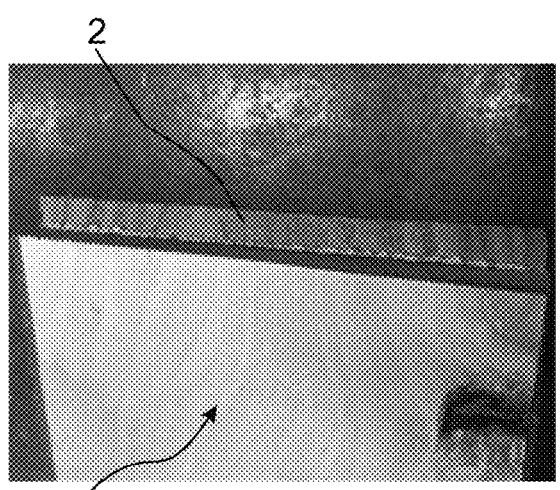
Figure 7D:
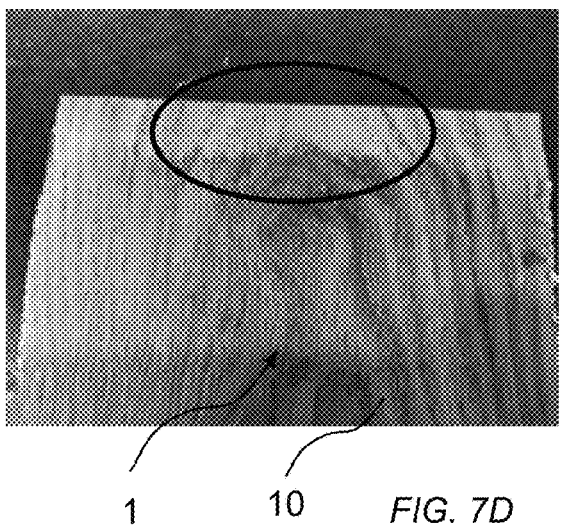

FIGS. 7C and 7D shows positioning the balancing layer, which is a wood veneer along the core short edge and the surface layer, comprising a veneer with a protrusion of 10 mm outside the core (2) edge.

FIGS. 7A and 7B shows an incorrect positioning of the balancing layer (4), which is a veneer layer inside the edge of the building panel, with an offset to the surface veneer, wherein the surface layer (1) was positioned along the core edge.

Figure 7E:
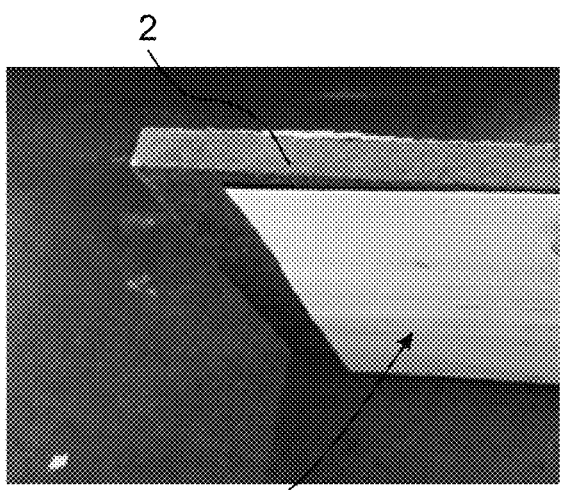
Figure 7F:
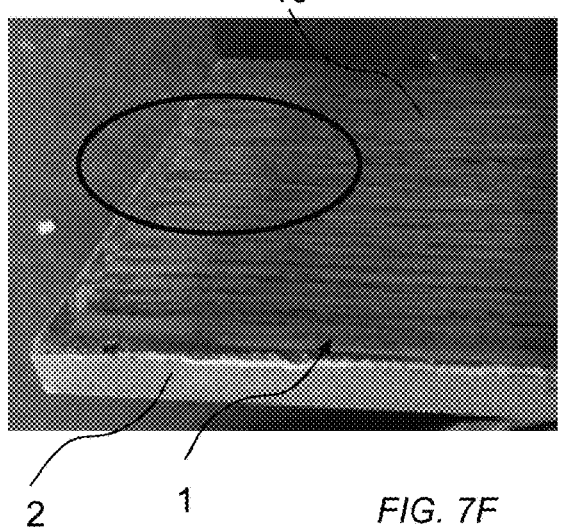

FIGS. 7E and 7F shows positioning of the surface layer (1) mm inside the short edge of the core (2) and the balancing layer (4) 10 mm inside the core (2).

Figure 8A:
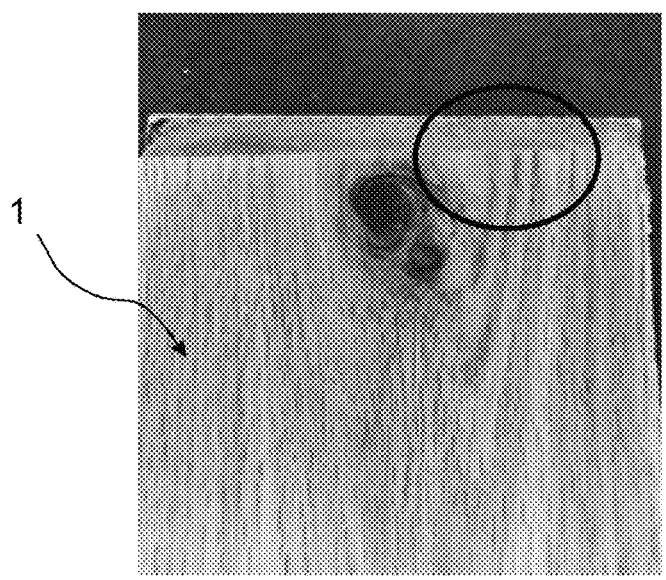
FIGS. 8A-C discloses positioning of the surface layer relative the balancing layer.
Figure 8B:
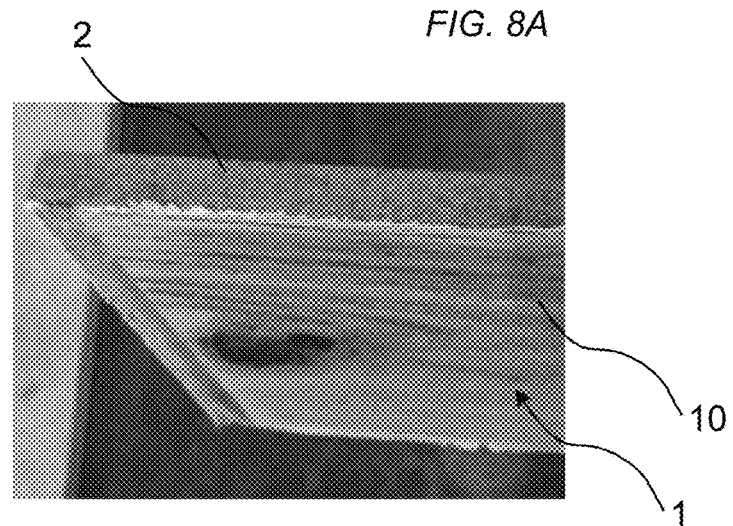
Figure 8C:
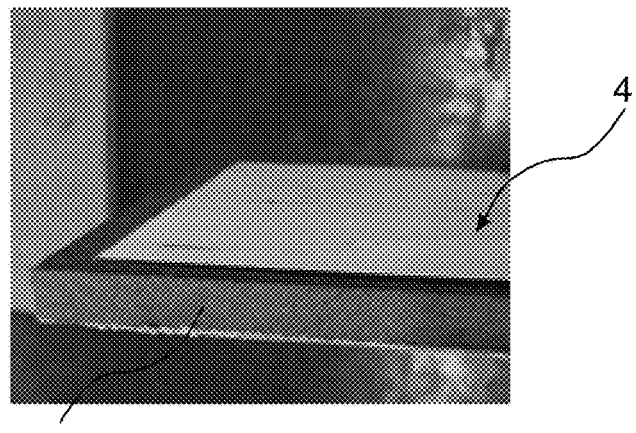

FIG. 8A shows that when an edge of the balancing layer is positioned in line with the edge of the surface layer and in line with the edge of the core. FIGS. 8B-C shows that when an edge of the balancing layer and the edge of the surface layer is displaced inside the building panel by 10 mm.

In one embodiment, there is a building panel (11), comprising: a balancing layer (4) comprising a second wood veneer having a longitudinal length (X4) measured along a longitudinal edge of the building panel and a latitudinal length (Y4) measured along a latitudinal edge of the building panel, a top surface (4a) and a bottom surface (4b). The building panel further comprises a first sub-layer (3a) comprising a binder arranged on the top surface (4a) of the balancing layer (4). A surface layer (1) comprising a first wood veneer and arranged on top of the first sub-layer (3a); said surface layer (1) having a length (X1) measured along a longitudinal edge of the surface layer and a length (Y1) measured along a latitudinal edge of the surface layer (1), a top surface (1a) and a bottom surface (1b). The bottom surface (4a) of the balancing layer (4) is configured to be mounted on a target surface suitable for covering with the building panel (11) and the top surface (1a) of the surface layer (1) is configured to be an outer surface of the building panel (11). In the building panel, wherein the longitudinal length (X1) of the surface layer (1) is essentially equal or less than to the longitudinal length (X4) of the balancing layer (4). The latitudinal length (Y1) of the surface layer (1) is equal or less the latitudinal length (Y4) of the balancing layer (4) and the surface layer (1) is positioned on the first sub-layer (3a) such that the longitudinal and the latitudinal edges of the surface layer (1) do not extend beyond the corresponding longitudinal and latitudinal edges of the balancing layer (4) respectively (FIG. 5D).

A length measure along a longitudinal edge is the longitudinal length and the length along the latitudinal edge is a latitudinal length. By latitudinal edge is also meant a transverse edge. By latitudinal length is meant a length in a transverse direction. The transverse direction extends in a direction transverse to the longitudinal direction in the plane of the element. The latitudinal edge may be a short edge. The longitudinal edge may be by a long edge.

An incorrect placing of the surface layer relative balancing layer may lead to a discolouring in some portions of the surface layer, visible as areas of a colour lighter than the rest of the panel. This phenomenon is called in the present application a "waterfall". Most obviously, such colour variation may be observed at the edges of the building panel, and in particular at the short edges of the building panel. It is typically observed along the edges of the building panel after pressing. Such "waterfall" tendency is more apparent at short edges of the building panel after pressing. If such undesired colour variation occurs in the middle of the panel the entire panel is typically discarded. If an undesired colour variation occurred at the short edge of the panel, the edge may be cut away. This will make the panel shorter. Therefore, all other panels in a set shall be cut to the same size, which increases the production costs.

It shall be noted that "a waterfall" is observed as a discoloration on light coloured wood veneers, such as oak. If a dark wood is used as a source of wood veneer, the discoloration may be less apparent. Nevertheless, the "waterfall" tendency is still observed. In such case the "waterfall" may be noted, because the surface veneer tends to disconnect from the core at the edges, in particular when the ready panel is transported or mounted on the target substrate, such as floor. In such case the panel with the inferior attachment of the top veneer layer shall be put to waste. This also increases the production costs.

Without wish to be bound by any theory the inventors contemplated that incorrect positioning gives the binder a way to flow horizontally and climb along the veneer outside of the core (2), instead of vertically. Vertical penetration is desired for penetrating both the board and veneer in order to provide a desired colouring pattern.

The veneer of the balancing layer (4) should never be placed with a negative offset relative the veneer of the surface layer; meaning: if the surface veneer area was to be projected onto the balancing veneer, the surface veneer shall be completely covered by the balancing veneer. No edge of the balancing veneer should fall shorter than the edges of the surface veneer in any direction, as it will project a pressure difference in the building panel during pressing and this will show as a waterfall on the top surface of the surface wood veneer.

In respect to waterfall tendencies, the positioning between the core and the veneer of the balancing layer is not sensitive in respect to the "waterfall" tendency on the surface layer.

The building panel may be a floor panel, a wall panel, a ceiling panel, a furniture component, skirting boards, mouldings, edging profiles, etc.

The balancing layer (4) and the surface layer (1) may comprise the same type or a different type wood veneer.

The balancing layer may comprise a low-quality veneer. The building panel may be provided with a thinner veneer than known building panels with veneer, since the first and/or the second sub-layer reinforces the veneer.

In an embodiment, the building panel further comprise a core (2) having a top surface (2a) and a bottom surface (2b) and having a length (X2) measured along a longitudinal edge of the building panel and a length (Y2) measured along a latitudinal edge of the building panel. The building panel further comprises a second sub-layer (3b) arranged on the top surface (2a) of the core (2). Said core (2) and the second sub-layer (3b) may be arranged in the building panel such that the second sub-layer (3b) is positioned between the top surface of the core (2a) and the bottom surface (1b) of the surface layer (1) and wherein the bottom surface of the core (2b) is in contact with the first sub-layer (3a) (FIG. 5A-C).

In an embodiment, a core (2) may be a wood-based board, for example, a wood-fibre based board such as MDF or HDF, or plywood or wood veneer. The core may be a Wood Plastic Composite (WPC). In an embodiment, the core may be a mineral composite board, a fibre cement board, a magnesium oxide cement board, a ceramic board, or a plastic board such as a thermoplastic board. In an embodiment, a core may be a veneer, preferably a wood veneer.

Preferably, the core is a pre-fabricated core.

In an embodiment, the longitudinal length (X1) of the surface layer (1) and/or longitudinal length (X4) of the balancing layer (4) is equal or less than the longitudinal length (X2) of the core (2) and the latitudinal length (Y1) of the surface layer and latitudinal length (Y4) of the balancing layer (4) is equal or less of the latitudinal length of the core Y2).

In an embodiment, the balancing layer (4) and a surface layer (1) are mounted onto a core (2) such that the longitudinal and latitudinal edges of the balancing layer and surface layer respectively do not protrude beyond the longitudinal and latitudinal edges of the core.

In an embodiment, the binder is in a powder form.

In an embodiment, the core (2) may have a thickness D2 after pressing of between 2 and 15 mm. The core may have a thickness D2 after pressing between 3 mm and 11 mm, such as between 4 mm and 10 mm, such as between 5 mm and 9 mm, such as between 6 and 8 mm.

The thickness is measured in a panel, after heat and pressure has been applied to all layers. Thus, the panel has been at least partially cured.

In an embodiment, the surface layer (1) may have a thickness D1 after pressing of between 0.2 and 2.5 mm, such as between 0.25 mm and 2 mm, such as about 0.5 mm, such as about 1 mm, such as about 1.5 mm.

In an embodiment, the balancing layer (4) has a thickness D4 after pressing of between 0.2 mm and 2.5 mm, such as between 0.25 mm and 2 mm, such as about 0.5 mm, such as about 1 mm, such as about 1.5 mm.

In an embodiment, the balancing layer may be the same thickness as the surface layer, or may differ in thickness from the surface layer.

In an embodiment, the first sub-layer (3a) and/or the second sub-layer (3b) may comprise inorganic fillers. The fillers are preferably in a powder form. The inorganic fillers may be selected from barium sulphate and calcium carbonate.

In an embodiment, the first sub-layer (3a) may comprise a filler and a binder.

The binder in the first and/or second sub-layer may be an amino resin, such as melamine formaldehyde resin, urea formaldehyde resin, phenol formaldehyde resin, or a combination thereof.

The binder may be wood mastic, wood filler or any other type of putty-like paste. Wood filler may be in a powder form.

Some other fillers used in a first and/or second sub-layer (3a, 3b). There may be additional organic particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The filler may be starch such as maize starch, potato starch, etc. Preferably, any of the fillers are in the powder form.

The sub-layer (3a) and or (3b) may be applied in an amount of 200-600 g/m2, preferably 300-500 g/m2 such as about 400 g/m2, such as about 430-470 g/sm2, such as 500-550 g/m2. The sub-layer 3 may comprise the binder in an amount of 20-80 wt %, preferably in an amount of 40-60 wt % such as about 50 wt %.

In an embodiment, the first sub-layer (3a) and/or the second sub-layer (3b) comprise fibres, preferably wood fibres. Wood fibres are preferably in a powder form.

In an embodiment, the core (2) is a fibre based core, preferably HDF board.

In an embodiment, the binder in the first and/or second sub-layer is thermoplastic or thermosetting binder. In an embodiment, the binder in the first sub-layer (3a) may be the same or different from the binder of the second sub-layer (3b).

The binder in the sub-layer may be a melamine resin. The binder in the sub-layer may be an amino resin, such as melamine formaldehyde resin, urea formaldehyde resin, phenol formaldehyde resin, or a combination thereof.

The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The binder may be wood mastic, wood filler or any other type of putty-like paste. Wood filler is preferably in a powder form.

The sub-layer may be substantially or completely formaldehyde free.

The first sub-layer 3a and/or the second sub-layer 3b may be a pre-pressed layer, wherein the binder has not completely cured during the pre-pressing.

The first and/or second sub-layer (3a, 3b) may comprise a foaming agent.

The first and/or the second wood veneer layer may be selected but not limited to oak, maple, birch, walnut, ash, pine.

The thickness (D) of the building panel in a pressed state may between 1 mm and 20 mm, preferably between 4 mm and 12 mm. The thickness may be measure after applying heat and pressure to obtain a building panel.

In an embodiment, a pressed building panel after pressing may be 6-25 mm thick, preferably 8-15 mm thick after pressing, while the core may be 5-18 mm thick, preferably 7-14 mm thick. The sub-layer may be 0.1-2 mm thick after pressing.

The building panel may be selected from a floor panel, a wall panel or a furniture panel.

In an embodiment there is provided a method to produce a building panel (11) comprising: providing balancing layer (4) comprising a second wood veneer having a length (X4) measured along a longitudinal edge of the balancing layer (4) and a width (Y4) measured along a latitudinal edge of the balancing layer (4), a top surface (4a) and a bottom surface (4b); wherein the bottom surface (4a) of the balancing layer (4) in the assembled building panel is configured to be mounted on a target surface suitable for covering with the building panel (11). The method further comprises applying a binder on a top surface (4a) of the balancing layer (4) to obtain a first sub-layer (3a). A surface layer (1) comprising a first wood veneer is then applied on the first sub-layer (3a). A surface layer (1) has a length (X1) measured along a longitudinal edge of the surface layer (1) and a length (Y1) measured along a latitudinal edge of the surface layer (1), a top surface (1a) and a bottom surface (1b). The length (X1) of the surface layer (1) is essentially equal or less to the length (X4) of the balancing layer (4) in the building panel. The length (Y1) of the surface layer (1) is equal or less the length (Y4) of the balancing layer (4) in the building panel. A heat and pressure are applied to the surface layer (1), the first sub-layer (3a) and the balancing layer (4) to obtain a building panel (11). The surface layer (1) is applied on the first sub-layer (3a) such that the longitudinal and the latitudinal edges of the surface layer (1) do not extend beyond the corresponding longitudinal and latitudinal edges of the balancing layer (4) in the assembled building panel (11). The sub-layer may be applied by the scattering. The pressure may be continuous or discontinuous.

In an embodiment a there is provided the method to produce a building panel (11), the method comprising providing balancing layer (4) comprising a second wood veneer having a length (X4) measured along a longitudinal edge of the balancing layer (4) and a width (Y4) measured along a latitudinal edge of the balancing layer (4), a top surface (4a) and a bottom surface (4b); wherein the bottom surface (4a) of the balancing layer (4) in the assembled building panel is configured to be mounted on a target surface suitable for covering with the building panel (11). The method further comprises applying a binder on a top surface (4a) of the balancing layer (4) to obtain a first sub-layer (3a). The method further comprises applying a core (2) having a top surface (2a), a bottom surface (2b) and having a length (X2) measured along a longitudinal edge of the core (2) and a length (Y2) measured along a latitudinal edge of the core (2) such that the bottom surface (2b) is in a contact with the first sub-layer (3a). The method further comprises applying a binder on a top surface (2a) of the core to obtain a second sub-layer (3b). The method further comprises applying a surface layer (1) on the second sub-layer (3b), a surface layer (1) having a length (X1) measured along a longitudinal edge of the surface layer (1) and a length (Y1) measured along a latitudinal edge of the surface layer (1), a top surface (1a) and a bottom surface (1b); wherein the length (X1) of the surface layer (1) is essentially equal or less to the length (X4) of the balancing layer (4); and the length (Y1) of the surface layer (1) is equal or less the length (Y4) of the balancing layer (4). Heat and pressure to the surface layer (1), the second sub-layer (3b), the core (2), the first sub-layer (3a) and the balancing layer (4) to obtain a building panel (11). The surface layer (1) is applied on the second sub-layer (3b) such that the longitudinal and the latitudinal edges of the surface layer (1) do not extend beyond the corresponding longitudinal and latitudinal edges of the balancing layer (4) in the assembled building panel (11).

The pressure may be applied by a continuous press or a discontinuous press.

The method may further comprise applying a protective layer, applied on a top surface (1a) of the surface layer (1).

The first and/or the second sub-layer (3a, 3b) may be applied by scattering.

All the aspects and embodiments discussed in relation to the building panel are equally applicable to the method for producing a building panel.

Using a protective overlay with wear resistant particles and/or other inorganic fillers applied on the veneer is not excluded and this could increase the wear resistance of a wood veneer. Dry and wet overlays, which are produced by production methods where for example thermosetting resins in dry or wet form may be mixed with aluminium oxide. Aluminium oxide particles mixed with melamine powder could for example be applied on a wood veneer prior to pressing and a wear resistant surface could be obtained without any surface coating after pressing. Dry and wet overlays may be applied on the surface layer prior to pressing. Wax may be applied, for example, as a powder, prior to pressing on the veneer. A lacquer may also be applied on the surface layer after pressing. A protective foil may also be applied The length (X1) of the surface layer (1) may be essentially equal or less to the length (X2) of the core (2); and the length (Y1) of the surface layer (1) may be equal or less the length (Y2) of the core (2).

The binder may be in a powder form.

The filler may be applied in a powder form, preferably by scattering.

Embodiments

In one aspect there is provided a building panel, comprising: a balancing layer comprising a second wood veneer having a longitudinal length (X4) measured along a longitudinal edge of the building panel and a latitudinal length (Y4) measured along a latitudinal edge of the building panel, a top surface and a bottom surface, a first sub-layer comprising a binder arranged on the top surface of the balancing layer; a surface layer comprising a first wood veneer and arranged on top of the first sub-layer; said surface layer having a length (X1) measured along a longitudinal edge of the surface layer and a length (Y1) measured along a latitudinal edge of the surface layer, a top surface and a bottom surface; the bottom surface of the balancing layer is configured to be mounted on a target surface suitable for covering with the building panel and the top surface of the surface layer is configured to be an outer surface of the building panel, wherein the longitudinal length (X1) of the surface layer is essentially equal or less than the longitudinal length (X4) of the balancing layer; the latitudinal length (Y1) of the surface layer is equal or less than the latitudinal length (Y4) of the balancing layer and the surface layer is positioned on the first sub-layer such that the longitudinal and the latitudinal edges of the surface layer do not extend beyond the corresponding longitudinal and latitudinal edges of the balancing layer respectively.

In another aspect there is provided the building panel, further comprising a core having a top surface and a bottom surface and having a length (X2) measured along a longitudinal edge of the building panel and a length (Y2) measured along a latitudinal edge of the building panel and a second sub-layer arranged on the top surface of the core, said core and the second sub-layer arranged in the building panel such that the second sub-layer is positioned between the top surface of the core and the bottom surface of the surface layer and wherein the bottom surface of the core is in contact with the first sub-layer.

In another aspect, there is provided the building panel, wherein the longitudinal length (X1) of the surface layer and/or longitudinal length (X4) of the balancing layer is equal or less than the longitudinal length (X2) of the core and the latitudinal length (Y1) of the surface layer and latitudinal length (Y4) of the balancing layer is equal or less of the latitudinal length of the core Y2.

In another aspect, there is provided the building panel, wherein the binder is in a powder form.

In another aspect, there is provided the building panel, wherein the core has a thickness D2 in a pressed panel of between 2 and 15 mm.

In another aspect, there is provided the building panel, wherein the surface layer has a thickness D1 in a pressed panel of between 0.2 and 2.5 mm.

In another aspect, there is provided the building panel, wherein the balancing layer has a thickness D4 in a pressed panel of between 0.2 mm and 2.5 mm.

In another aspect, there is provided the building panel, wherein the first sub-layer and/or the second sub-layer comprise inorganic fillers.

In another aspect, there is provided the building panel, wherein the first sub-layer and/or the second sub-layer comprise fibres, preferably wood fibres.

In another aspect, there is provided the building panel, wherein the core is a fibre-based core, preferably HDF board.

In another aspect, there is provided the building panel, wherein the binder in the first and/or second sub-layer is thermoplastic or thermosetting binder.

In another aspect, there is provided the building panel, wherein the binder in the first sub-layer is the same or different from the binder of the second sub-layer.

In another aspect there is provided the building panel, wherein the binder in the first and/or second sub-layer is a melamine formaldehyde resin.

In another aspect there is provided the building panel as claimed in any one of the preceding claims, wherein the first and/or second sub-layer comprises a foaming agent.

In another aspect there is provided the building panel, wherein the first and/or the second wood veneer layer is selected from oak, maple, birch, walnut, ash, pine.

In another aspect there is provided the building panel, wherein the thickness (D) of the pressed building panel is between 1 mm and 20 mm, preferably between 4 mm and 12 mm.

In another aspect there is provided the building panel, wherein the building panel is selected from a floor panel, a wall panel or a furniture panel.

In another aspect there is provided a method to produce a building panel, the method comprising: providing balancing layer comprising a second wood veneer having a length (X4) measured along a longitudinal edge of the balancing layer and a width (Y4) measured along a latitudinal edge of the balancing layer, a top surface and a bottom surface; wherein the bottom surface of the balancing layer in the assembled building panel is configured to be mounted on a target surface suitable for covering with the building panel; applying a binder on a top surface of the balancing layer to obtain a first sub-layer; applying a surface layer comprising a first wood veneer on the first sub-layer, a surface layer having a length (X1) measured along a longitudinal edge of the surface layer and a length (Y1) measured along a latitudinal edge of the surface layer, a top surface and a bottom surface; wherein the length (X1) of the surface layer is essentially equal or less to the length (X4) of the balancing layer; and the length (Y1) of the surface layer is equal or less the length (Y4) of the balancing layer; applying heat and pressure to the surface layer, the first sub-layer and the balancing layer to obtain a building panel, wherein the surface layer is applied on the first sub-layer such that the longitudinal and the latitudinal edges of the surface layer do not extend beyond the corresponding longitudinal and latitudinal edges of the balancing layer in the assembled building panel.

In another aspect there is provided a method to produce a building panel, the method comprising: providing balancing layer comprising a second wood veneer having a length (X4) measured along a longitudinal edge of the balancing layer and a width (Y4) measured along a latitudinal edge of the balancing layer, a top surface and a bottom surface; wherein the bottom surface of the balancing layer in the assembled building panel is configured to be mounted on a target surface suitable for covering with the building panel; applying a binder on a top surface of the balancing layer to obtain a first sub-layer; applying a core having a top surface, a bottom surface and having a length (X2) measured along a longitudinal edge of the core and a length (Y2) measured along a latitudinal edge of the core such that the bottom surface is in a contact with the first sub-layer; applying a binder on a top surface of the core to obtain a second sub-layer; applying a surface layer on the second sub-layer, a surface layer having a length (X1) measured along a longitudinal edge of the surface layer and a length (Y1) measured along a latitudinal edge of the surface layer, a top surface and a bottom surface; wherein the length (X1) of the surface layer is essentially equal or less to the length (X4) of the balancing layer; and the length (Y1) of the surface layer is equal or less the length (Y4) of the balancing layer; applying heat and pressure to the surface layer, the second sub-layer, the core, the first sub-layer and the balancing layer to obtain a building panel, wherein the surface layer is applied on the second sub-layer such that the longitudinal and the latitudinal edges of the surface layer do not extend beyond the corresponding longitudinal and latitudinal edges of the balancing layer in the assembled building panel.

In another aspect, there is provided the method to produce the building panel, wherein the length (X1) of the surface layer is essentially equal or less to the length (X2) of the core; and the length (Y1) of the surface layer is equal or less the length (Y2) of the core.

In another aspect, there is provided the method to produce the building panel, wherein a binder is in a powder form.

In another aspect, there is provided the method to produce the building panel, wherein the first and/or the second sub-layer are applied by the scattering.

In another aspect, there is provided the method to produce the building panel, wherein the first and/or the second sub-layer further comprises inorganic fillers, preferably in a powder form.

In another aspect, there is provided the method to produce the building panel, wherein the first and/or the second sub-layer further comprises fibres, preferably wood fibres.

In another aspect, there is provided the method to produce the building panel, wherein the core is a fibre-based core, preferably HDF board.

In another aspect, there is provided the method to produce the building panel, wherein the binder is thermoplastic or thermosetting binder.

In another aspect, there is provided the method to produce the building panel, wherein the binder is a melamine formaldehyde resin.

In another aspect, there is provided the method to produce the building panel, wherein the powder comprising a binder further comprises a foaming agent.

In another aspect, there is provided the method to produce the building panel, wherein the wood veneer is 0.2 mm-2.5 mm, preferably 0.4 mm to 1 mm.

EXAMPLES

Example 1. Various Positioning Errors of Surface Layer Relative Balancing Layer

Example 1a

FIGS. 7A and B shows positioning the balancing layer, which is a veneer layer inside the edge of the building panel, with an offset to the surface veneer, wherein the surface veneer was positioned along the core edge. This results in a clear "waterfall" tendency on the top surface of the surface layer. In this particular example, the waterfall tendency is observed as a discoloration along the edge of the surface layer. Without wish to be bound by any theories, it might be explained by the thickness drop from the piece of missing balancing layer (the wood veneer). A clear "waterfall" tendency is seen on FIG. 7B.

Example 1 b

FIGS. 7C and D shows positioning the balancing layer, which is a wood veneer along the core short edge and the surface layer, comprising a veneer with a protrusion of 10 mm outside the core edge. A waterfall tendency was clearly seen on the surface layer of the building panel (FIG. 7D). As can be seen in FIG. 7C, the binder easily tends to climb out of the board area along the protrusion instead of impregnating the surface layer, which is a wood veneer. This creates a brighter colour called waterfall around the edge.

Example 1c

FIGS. 7E and F shows positioning of the surface layer 5 mm inside the short edge of the core (2) and the balancing layer (4) 10 mm inside the core (2). Thus, the surface layer was positioned protruding beyond the relative edge of the balancing layer. The "Waterfall" tendency is clearly visible on FIG. 7F.

Example 2. Correct Positioning of the Surface Layer Relative Balance Layer

Example 2

FIG. 8A shows that when a balancing layer is positioned in line with the surface layer no undesired discoloration, called "waterfall" tendency occurs. In this particular embodiment, the balancing layer and the surface layer are positioned also in line with the core.

FIGS. 8B-C shows that when an edge of the balancing layer is positioned in line with the edge of the surface layer and in line with the edge of the core. No undesired discoloration, called "waterfall" tendency occurs. FIGS. 8B-C shows that when an edge of the balancing layer and the edge of the surface layer is displaced inside the building panel by 5 mm. thus, the balancing layer and the surface layer are displaced by the same distance from the edge of the core and are in line with each other and no undesired discoloration, so-called "waterfall" tendency occurs.

The invention claimed is:

1. A building panel, comprising:
   a balancing layer having a top surface and a bottom surface,
   a first sub-layer is arranged on the top surface of the balancing layer, wherein the first sub-layer comprises a binder,
   a surface layer arranged above a first surface of the first sub-layer facing away from the balancing layer, the surface layer having a top surface and a bottom surface and comprising a first wood veneer having a grain direction, wherein the top surface of the surface layer is adapted to be a visible surface of the building panel when installed,
   wherein an extension of the surface layer in a direction parallel to the grain direction of the first wood veneer is less than an extension of the balancing layer in the direction parallel to the grain direction of the first wood veneer,
   wherein the surface layer is arranged within the extension of the balancing layer in the direction parallel to the grain direction of the first wood veneer, and
   wherein a portion of the first surface along an entire edge of the first sub-layer is free of contact with any surface layer comprising wood veneer.

2. The building panel according to claim 1, wherein an extension of the surface layer in a direction transverse to the grain direction of the first wood veneer is equal or less than an extension of the balancing layer in the direction transverse to the grain direction of the first wood veneer, and
   wherein the surface layer is arranged within the extension of the balancing layer in the direction transverse to the grain direction of the first wood veneer.

3. The building panel according to claim 1, further comprising
   a core having a top surface and a bottom surface,
   a second sub-layer arranged on the top surface of the core, wherein the second sub-layer is positioned between the top surface of the core and the bottom surface of the surface layer, and the bottom surface of the core is in contact with the first sub-layer.

4. The building panel according to claim 1, wherein the balancing layer comprises a second wood veneer.

5. The building panel according to claim 3, wherein the extension of the surface layer and/or the balancing layer in the direction parallel to the grain direction of the first wood veneer is equal or less than an extension of the core in the direction parallel to the grain direction of the first wood veneer.

6. The building panel according to claim 3, wherein the extension of the surface layer and/or the balancing layer in the direction transverse to the grain direction of the first wood veneer is equal or less than an extension of the core in the direction transverse to the grain direction of the first wood veneer.

7. The building panel according to claim 1, wherein the binder of the first sub-layer is applied in powder form.

8. The building panel according to claim 3, wherein the core has a thickness of between 2 and 12 mm.

9. The building panel according to claim 1, wherein the surface layer has a thickness of between 0.2 and 2.5 mm.

10. The building panel according to claim 1, wherein the balancing layer has a thickness of between 0.2 mm and 2.5 mm.

11. The building panel as claimed in claim 1, wherein the first sub-layer and/or a second sub-layer comprise(s) inorganic fillers.

12. The building panel as claimed in claim 1, wherein the first sub-layer and/or a second sub-layer comprise(s) fibres.

13. The building panel according to claim 3, wherein the core is a wood-based core.

14. The building panel according to claim 1, wherein the binder in the first sub-layer is thermoplastic or thermosetting binder.

15. The building panel according to claim 3, wherein the binder in the first sub-layer is the same or different from a binder of the second sub-layer.

16. The building panel according to claim 1, wherein the binder in the first sub-layer is an amino resin.

17. The building panel as claimed in claim 1, wherein the first sub-layer and/or a second sub-layer comprise(s) a foaming agent.

18. The building panel as claimed in claim 1, wherein the first wood veneer layer, and/or a second wood veneer layer of the balancing layer, is/are selected from oak, maple, birch, walnut, ash, pine.

19. The building panel according to claim 1, wherein the thickness of the building panel is between 1 mm and 20 mm.

20. The building panel according to claim 1, wherein the building panel is selected from a floor panel, a wall panel or a furniture panel.

\* \* \* \* \*